US011553493B2

(12) United States Patent
Akkarakaran et al.

(10) Patent No.: US 11,553,493 B2
(45) Date of Patent: Jan. 10, 2023

(54) SIDELINK BEAM MANAGEMENT

(71) Applicant: QUALCOMM Incorporated, San Diego, CA (US)

(72) Inventors: Sony Akkarakaran, Poway, CA (US); Ling Ding, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 17/103,108

(22) Filed: Nov. 24, 2020

(65) Prior Publication Data

US 2021/0160850 A1 May 27, 2021

Related U.S. Application Data

(60) Provisional application No. 62/941,716, filed on Nov. 27, 2019.

(51) Int. Cl.
*H04B 7/00* (2006.01)
*H04W 72/04* (2009.01)
*H04B 7/0408* (2017.01)

(52) U.S. Cl.
CPC ........ *H04W 72/048* (2013.01); *H04B 7/0408* (2013.01); *H04W 72/042* (2013.01); *H04W 72/044* (2013.01)

(58) Field of Classification Search
CPC ............. H04W 72/042; H04W 72/044; H04W 72/048; H04B 7/0408
See application file for complete search history.

(56) References Cited

U.S. PATENT DOCUMENTS

| 11,317,415 | B2 * | 4/2022 | Khoryaev | ............... G01S 19/46 |
| 2019/0045569 | A1 | 2/2019 | Abedini et al. | |
| 2020/0053704 | A1 * | 2/2020 | Kim | .................... H04W 74/006 |
| 2021/0036822 | A1 * | 2/2021 | Lyu | ..................... H04L 27/2613 |
| 2022/0166484 | A1 * | 5/2022 | Go | .......................... H04B 7/06 |

FOREIGN PATENT DOCUMENTS

WO WO-2019197036 A1 10/2019

OTHER PUBLICATIONS

International Search Report and Written Opinion—PCT/US2020/062377—ISA/EPO—dated Jun. 4, 2021.
Partial International Search Report—PCT/US2020/062377—ISA/EPO—dated Mar. 18, 2021.

* cited by examiner

*Primary Examiner* — Nhan T Le
(74) *Attorney, Agent, or Firm* — Holland & Hart LLP

(57) ABSTRACT

Methods, systems, and devices for wireless communications are described. A device may be configured to support multi-beam, or multi-panel operations, or both which may allow multiple sidelink transmissions to occur simultaneously. In some cases, flexible beam-management for the beamformed sidelink communications is implemented to manage the beams. A transmitting UE may indicate transmission beam information to the base station that the base station may use to schedule sidelink transmissions as part of a beam management procedure. The beam management procedure may allow a transmitting UE to update transmission beam information based on the mobility of the sidelink UEs and other environmental factors. In some cases, beam management includes a beam training procedure that may be implemented to refine the sidelink beams, where support for multi-panel and multi-beam operation may allow for multiple beams to be trained simultaneously.

30 Claims, 19 Drawing Sheets

SIDELINK BEAM MANAGEMENT

CROSS REFERENCE

The present Application for Patent claims the benefit of U.S. Provisional Patent Application No. 62/941,716 by AKKARAKARAN et al., entitled "SIDELINK BEAM MANAGEMENT," filed Nov. 27, 2019, assigned to the assignee hereof, and expressly incorporated by reference herein.

FIELD OF TECHNOLOGY

The following relates generally to wireless communications and more specifically to sidelink beam management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. A sidelink is a communication link between similar devices. For example, a sidelink may support communications between multiple UEs or may support communications between multiple base stations. In some communications systems, sidelink communications may support low throughput and reliability.

SUMMARY

The described techniques relate to improved methods, systems, devices, and apparatuses that support sidelink beam management. Generally, the described techniques may support sidelink beam management. For example, some systems (e.g., systems operating using millimeter wave (mmW) frequency ranges) may support beamformed sidelink transmissions to improve throughput and reliability. In some cases, a device (e.g., user equipment (UE)) supports multi-beam, or multi-panel operations, or both which may allow more than one sidelink transmission to occur at the same time. In some cases, flexible beam management for the beamformed sidelink communications is implemented. A transmitting UE may indicate transmission beam information to the base station, and the base station may use the transmission beam information to schedule sidelink transmissions as part of a beam management procedure. The beam management procedure, as described in the present disclosure, may allow a transmitting UE to update the transmission beam information based on the mobility of the UEs communicating via sidelink and other environmental factors. Throughput and reliability may be improved by implementing flexible beam management and simultaneous sidelink transmissions.

A method of wireless communications at a first UE is described. The method may include establishing a sidelink communications link with a second UE, receiving, from a base station, transmission beam information for a sidelink message to be transmitted from the first UE to the second UE, the transmission beam information including an indication of one or more transmission beams for transmission of the sidelink message, and transmitting the sidelink message to the second UE using the one or more transmission beams based on the transmission beam information.

An apparatus for wireless communications at a first UE is described. The apparatus may include a processor, memory coupled with the processor, and instructions stored in the memory. The instructions may be executable by the processor to cause the apparatus to establish a sidelink communications link with a second UE, receive, from a base station, transmission beam information for a sidelink message to be transmitted from the first UE to the second UE, the transmission beam information including an indication of one or more transmission beams for transmission of the sidelink message, and transmit the sidelink message to the second UE using the one or more transmission beams based on the transmission beam information.

Another apparatus for wireless communications at a first UE is described. The apparatus may include means for establishing a sidelink communications link with a second UE, receiving, from a base station, transmission beam information for a sidelink message to be transmitted from the first UE to the second UE, the transmission beam information including an indication of one or more transmission beams for transmission of the sidelink message, and transmitting the sidelink message to the second UE using the one or more transmission beams based on the transmission beam information.

A non-transitory computer-readable medium storing code for wireless communications at a first UE is described. The code may include instructions executable by a processor to establish a sidelink communications link with a second UE, receive, from a base station, transmission beam information for a sidelink message to be transmitted from the first UE to the second UE, the transmission beam information including an indication of one or more transmission beams for transmission of the sidelink message, and transmit the sidelink message to the second UE using the one or more transmission beams based on the transmission beam information.

Some examples of the method, apparatuses, and non-transitory computer-readable medium described herein may further include operations, features, means, or instructions for transmitting, to the base station, a set of beam parameters for a set of transmission beams for sidelink communications between the first UE and the second UE, the set of transmission beams including the one or more transmission beams.

In some examples of the method, apparatuses, and non-transitory computer-readable medium described herein, transmitting the set of beam parameters may include operations, features, means, or instructions for transmitting beam shape information for the set of transmission beams.

In some examples of the method, apparatuses, and non-transitory computer-readable medium described herein, transmitting the set of beam parameters may include operations, features, means, or instructions for transmitting panel orientation for one or more antenna panels associated with the set of transmission beams.

In some examples of the method, apparatuses, and non-transitory computer-readable medium described herein, transmitting the set of beam parameters may include operations, features, means, or instructions for transmitting geometric location of one or more antenna panels associated with the set of transmission beams.

In some examples of the method, apparatuses, and non-transitory computer-readable medium described herein, transmitting the set of beam parameters may include operations, features, means, or instructions for transmitting a relative location of one or more antenna panels associated with the set of transmission beams with respect to the first UE.

In some examples of the method, apparatuses, and non-transitory computer-readable medium described herein, transmitting the set of beam parameters may include operations, features, means, or instructions for transmitting beam identifiers for the set of transmission beams.

In some examples of the method, apparatuses, and non-transitory computer-readable medium described herein, transmitting the set of beam parameters may include operations, features, means, or instructions for transmitting codebook information for the set of transmission beams.

In some examples of the method, apparatuses, and non-transitory computer-readable medium described herein, transmitting the set of beam parameters may include operations, features, means, or instructions for transmitting beam shape information specific to a beam identifier for each antenna panel of the first UE.

Some examples of the method, apparatuses, and non-transitory computer-readable medium described herein may further include operations, features, means, or instructions for transmitting, to the base station, a set of beam pairs for a set of transmission beams for sidelink communications between the first UE and the second UE, where each of the set of beam pairs corresponds to a spatially separated pair of transmission beams at the first UE.

In some examples of the method, apparatuses, and non-transitory computer-readable medium described herein, transmitting the set of beam pairs may include operations, features, means, or instructions for transmitting respective transmission beam identifiers for each pair of transmission beams of the set of beam pairs.

Some examples of the method, apparatuses, and non-transitory computer-readable medium described herein may further include operations, features, means, or instructions for transmitting, to the base station, measurement information associated with sidelink communications between the first UE and the second UE, where the transmission beam information may be based on the measurement information.

In some examples of the method, apparatuses, and non-transitory computer-readable medium described herein, transmitting the measurement information may include operations, features, means, or instructions for transmitting a beam report that indicates one or more measurement parameters for a pair of transmission beams at the first UE.

In some examples of the method, apparatuses, and non-transitory computer-readable medium described herein, the one or more measurement parameters include a rank indicator, a signal to interference plus noise ratio, a spectral efficiency, a cross-beam interference metric, or any combination thereof.

In some examples of the method, apparatuses, and non-transitory computer-readable medium described herein, receiving the transmission beam information may include operations, features, means, or instructions for receiving the transmission beam information via downlink control information (DCI), radio resource control (RRC) signaling, or a medium access control (MAC) control element (MAC-CE).

In some examples of the method, apparatuses, and non-transitory computer-readable medium described herein, the transmission beam information includes beam identifiers and a time-frequency resource configuration for each of the one or more transmission beams.

In some examples of the method, apparatuses, and non-transitory computer-readable medium described herein, the first and second UEs may be configured for multiple-input multiple-output (MIMO) communications via the sidelink communications link.

In some examples of the method, apparatus, and non-transitory computer-readable medium described herein, the base station includes a cellular base station or a controlling UE.

A method of wireless communications at a first UE is described. The method may include establishing a sidelink communications link with a second UE, receiving, from a base station, beam training information for a sidelink beam training procedure between the first UE and the second UE, and performing the sidelink beam training procedure with the second UE based on the beam training information.

An apparatus for wireless communications at a first UE is described. The apparatus may include a processor, memory coupled with the processor, and instructions stored in the memory. The instructions may be executable by the processor to cause the apparatus to establish a sidelink communications link with a second UE, receive, from a base station, beam training information for a sidelink beam training procedure between the first UE and the second UE, and perform the sidelink beam training procedure with the second UE based on the beam training information.

Another apparatus for wireless communications at a first UE is described. The apparatus may include means for establishing a sidelink communications link with a second UE, receiving, from a base station, beam training information for a sidelink beam training procedure between the first UE and the second UE, and performing the sidelink beam training procedure with the second UE based on the beam training information.

A non-transitory computer-readable medium storing code for wireless communications at a first UE is described. The code may include instructions executable by a processor to establish a sidelink communications link with a second UE, receive, from a base station, beam training information for a sidelink beam training procedure between the first UE and the second UE, and perform the sidelink beam training procedure with the second UE based on the beam training information.

Some examples of the method, apparatuses, and non-transitory computer-readable medium described herein may further include operations, features, means, or instructions for receiving, from the second UE, antenna panel information including a number of antenna panels and respective panel orientations for a set of antenna panels of the second UE, and transmitting, to the second UE, additional beam training information for a sidelink beam training procedure between the first UE and the second UE based on the antenna panel information, where the additional beam training information indicates that the sidelink beam training procedure may be for different antenna panels of the second UE being used within a partially overlapping time period.

Some examples of the method, apparatuses, and non-transitory computer-readable medium described herein may further include operations, features, means, or instructions for transmitting, to the base station, an indication of one or more wide beams of the first UE for the sidelink beam training procedure for one or more narrow beams of the first UE for the sidelink beam training procedure, receiving additional beam training information from the base station, where the additional beam training information indicates to use different antenna panels at the second UE within a partially overlapping time period, and transmitting the additional beam training information to the second UE.

In some examples of the method, apparatuses, and non-transitory computer-readable medium described herein, the beam training information indicates a set of transmission beams at the first UE, and the sidelink beam training procedure may be performed simultaneously for multiple transmission beams in the set of transmission beams.

In some examples of the method, apparatuses, and non-transitory computer-readable medium described herein, the sidelink beam training procedure may be an orthogonalized beam training procedure according to one of code division multiplexing (CDM), sequence-based training, or frequency division multiplexing (FDM).

Some examples of the method, apparatuses, and non-transitory computer-readable medium described herein may further include operations, features, means, or instructions for concurrently transmitting reference signals via multiple transmission beams at the first UE.

A method of wireless communications at a receive UE is described. The method may include establishing a sidelink communications link with a transmit UE, transmitting, to a base station, information related to beamformed communications via the sidelink communications link between the transmit UE and the receive UE, and receiving a beamformed transmission from the transmit UE via the sidelink communications link based on the information.

An apparatus for wireless communications at a receive UE is described. The apparatus may include a processor, memory coupled with the processor, and instructions stored in the memory. The instructions may be executable by the processor to cause the apparatus to establish a sidelink communications link with a transmit UE, transmit, to a base station, information related to beamformed communications via the sidelink communications link between the transmit UE and the receive UE, and receive a beamformed transmission from the transmit UE via the sidelink communications link based on the information.

Another apparatus for wireless communications at a receive UE is described. The apparatus may include means for establishing a sidelink communications link with a transmit UE, transmitting, to a base station, information related to beamformed communications via the sidelink communications link between the transmit UE and the receive UE, and receiving a beamformed transmission from the transmit UE via the sidelink communications link based on the information.

A non-transitory computer-readable medium storing code for wireless communications at a receive UE is described. The code may include instructions executable by a processor to establish a sidelink communications link with a transmit UE, transmit, to a base station, information related to beamformed communications via the sidelink communications link between the transmit UE and the receive UE, and receive a beamformed transmission from the transmit UE via the sidelink communications link based on the information.

In some examples of the method, apparatuses, and non-transitory computer-readable medium described herein, transmitting the information related to beamformed communications via the sidelink communications link may include operations, features, means, or instructions for transmitting, to the base station, a set of beam parameters for a set of reception beams for sidelink communications between the first UE and the second UE, where the set of beam parameters includes beam shape information for the set of reception beams, panel orientation for one or more antenna panels associated with the set of reception beams, geometric location of one or more antenna panels associated with the set of reception beams, a relative location of one or more antenna panels associated with the set of reception beams with respect to the first UE, beam identifiers for the set of reception beams, codebook information for the set of reception beams, beam shape information specific to a beam identifier for each antenna panel of the receive UE.

In some examples of the method, apparatuses, and non-transitory computer-readable medium described herein, transmitting the information related to beamformed communications via the sidelink communications link may include operations, features, means, or instructions for transmitting, to the base station, a set of beam pairs for a set of reception beams for sidelink communications between the first UE and the second UE, where each of the set of beam pairs corresponds to a spatially separated pair of reception beams at the receive UE.

In some examples of the method, apparatuses, and non-transitory computer-readable medium described herein, transmitting the information related to beamformed communications via the sidelink communications link may include operations, features, means, or instructions for transmitting, to the base station or the transmit UE, a beam report that indicates one or more measurement parameters for a pair of reception beams at the receive UE, where the one or more measurement parameters include a rank indicator, a signal to interference plus noise ratio, a spectral efficiency, a cross-beam interference metric, or any combination thereof.

A method of wireless communications at a base station is described. The method may include establishing a communication link with a first UE configured for sidelink communications with a second UE, determining one or more transmission beams for the first UE to be used for sidelink communications with the second UE, and transmitting, to the first UE, transmission beam information for a sidelink message to be transmitted from the first UE to the second UE, the transmission beam information including an indication of the one or more transmission beams for transmission of the sidelink message.

An apparatus for wireless communications at a base station is described. The apparatus may include a processor, memory coupled with the processor, and instructions stored in the memory. The instructions may be executable by the processor to cause the apparatus to establish a communication link with a first UE configured for sidelink communications with a second UE, determine one or more transmission beams for the first UE to be used for sidelink communications with the second UE, and transmit, to the first UE, transmission beam information for a sidelink message to be transmitted from the first UE to the second UE, the transmission beam information including an indication of the one or more transmission beams for transmission of the sidelink message.

Another apparatus for wireless communications at a base station is described. The apparatus may include means for establishing a communication link with a first UE configured for sidelink communications with a second UE, determining one or more transmission beams for the first UE to be used for sidelink communications with the second UE, and transmitting, to the first UE, transmission beam information for a sidelink message to be transmitted from the first UE to the second UE, the transmission beam information including an indication of the one or more transmission beams for transmission of the sidelink message.

A non-transitory computer-readable medium storing code for wireless communications at a base station is described. The code may include instructions executable by a processor to establish a communication link with a first UE configured for sidelink communications with a second UE, determine one or more transmission beams for the first UE to be used for sidelink communications with the second UE, and transmit, to the first UE, transmission beam information for a sidelink message to be transmitted from the first UE to the second UE, the transmission beam information including an indication of the one or more transmission beams for transmission of the sidelink message.

Some examples of the method, apparatuses, and non-transitory computer-readable medium described herein may further include operations, features, means, or instructions for receiving, from the first UE or the second UE, a set of beam parameters for a set of transmission beams for sidelink communications between the first UE and the second UE, the set of transmission beams including the one or more transmission beams, and determining the one or more transmission beams based on the set of beam parameters.

In some examples of the method, apparatuses, and non-transitory computer-readable medium described herein, the set of beam parameters includes beam shape information for the set of transmission beams.

In some examples of the method, apparatuses, and non-transitory computer-readable medium described herein, the set of beam parameters includes panel orientation for one or more antenna panels associated with the set of transmission beams.

In some examples of the method, apparatuses, and non-transitory computer-readable medium described herein, the set of beam parameters includes geometric location of one or more antenna panels associated with the set of transmission beams.

In some examples of the method, apparatuses, and non-transitory computer-readable medium described herein, the set of beam parameters includes a relative location of one or more antenna panels associated with the set of transmission beams with respect to the first UE.

In some examples of the method, apparatuses, and non-transitory computer-readable medium described herein, the set of beam parameters includes beam identifiers for the set of transmission beams.

In some examples of the method, apparatuses, and non-transitory computer-readable medium described herein, the set of beam parameters includes codebook information for the set of transmission beams.

In some examples of the method, apparatuses, and non-transitory computer-readable medium described herein, the set of beam parameters includes beam shape information specific to a beam identifier for each antenna panel of the first UE.

Some examples of the method, apparatuses, and non-transitory computer-readable medium described herein may further include operations, features, means, or instructions for receiving, from the first UE or the second UE, a set of beam pairs for a set of transmission beams for sidelink communications between the first UE and the second UE, where each of the set of beam pairs corresponds to a spatially separated pair of transmission beams at the first UE, and determining the one or more transmission beams based on the set of beam pairs.

In some examples of the method, apparatuses, and non-transitory computer-readable medium described herein, the set of beam pair includes respective transmission beam identifiers for each pair of transmission beams of the set of beam pairs.

Some examples of the method, apparatuses, and non-transitory computer-readable medium described herein may further include operations, features, means, or instructions for receiving, from the first UE or the second UE, measurement information associated with sidelink communications between the first UE and the second UE, and determining the one or more transmission beams based on the measurement information.

In some examples of the method, apparatuses, and non-transitory computer-readable medium described herein, the measurement information includes a rank indicator, a signal to interference plus noise ratio, a spectral efficiency, a cross-beam interference metric, or any combination thereof associated with a set of transmission beams of the first UE.

Some examples of the method, apparatuses, and non-transitory computer-readable medium described herein may further include operations, features, means, or instructions for transmitting the transmission beam information via DCI, RRC signaling, or a MAC-CE.

In some examples of the method, apparatuses, and non-transitory computer-readable medium described herein, the transmission beam information includes beam identifiers and a time-frequency resource configuration for each of the one or more transmission beams.

Some examples of the method, apparatuses, and non-transitory computer-readable medium described herein may further include operations, features, means, or instructions for transmitting, to the first UE, beam training information for a sidelink beam training procedure between the first UE and the second UE, the beam training information indicating a set of transmission beams at the first UE.

Some examples of the method, apparatuses, and non-transitory computer-readable medium described herein may further include operations, features, means, or instructions for receiving a report of the sidelink beam training procedure from the first UE or the second UE based on the beam training information, and determining the one or more transmission beams based on the report.

Some examples of the method, apparatuses, and non-transitory computer-readable medium described herein may further include operations, features, means, or instructions for receiving, from the second UE, antenna panel information including a number of antenna panels and respective panel orientations for a set of antenna panels of the second UE, and transmitting, to the second UE or the first UE, beam training information for a sidelink beam training procedure between the first UE and the second UE based on the antenna panel information, where the beam training information indicates that the sidelink beam training procedure may be for different antenna panels of the second UE being used within a partially overlapping time period.

Some examples of the method, apparatuses, and non-transitory computer-readable medium described herein may further include operations, features, means, or instructions for receiving, from the first UE, an indication of one or more wide beams of the first UE for the sidelink beam training procedure for one or more narrow beams of the first UE for the sidelink beam training procedure, and transmitting additional beam training information to the first UE, where the additional beam training information indicates to use different antenna panels at the second UE within a partially overlapping time period.

A method of wireless communications at a base station is described. The method may include establishing a communication link with a first UE configured for sidelink communications with a second UE, determining beam training information for a sidelink beam training procedure between the first UE and the second UE, and transmitting, to the first UE, an indication of the beam training information.

An apparatus for wireless communications at a base station is described. The apparatus may include a processor, memory coupled with the processor, and instructions stored in the memory. The instructions may be executable by the processor to cause the apparatus to establish a communication link with a first UE configured for sidelink communications with a second UE, determine beam training information for a sidelink beam training procedure between the first UE and the second UE, and transmit, to the first UE, an indication of the beam training information.

Another apparatus for wireless communications at a base station is described. The apparatus may include means for establishing a communication link with a first UE configured for sidelink communications with a second UE, determining beam training information for a sidelink beam training procedure between the first UE and the second UE, and transmitting, to the first UE, an indication of the beam training information.

A non-transitory computer-readable medium storing code for wireless communications at a base station is described. The code may include instructions executable by a processor to establish a communication link with a first UE configured for sidelink communications with a second UE, determine beam training information for a sidelink beam training procedure between the first UE and the second UE, and transmit, to the first UE, an indication of the beam training information.

DETAILED DESCRIPTION

Figure 1:
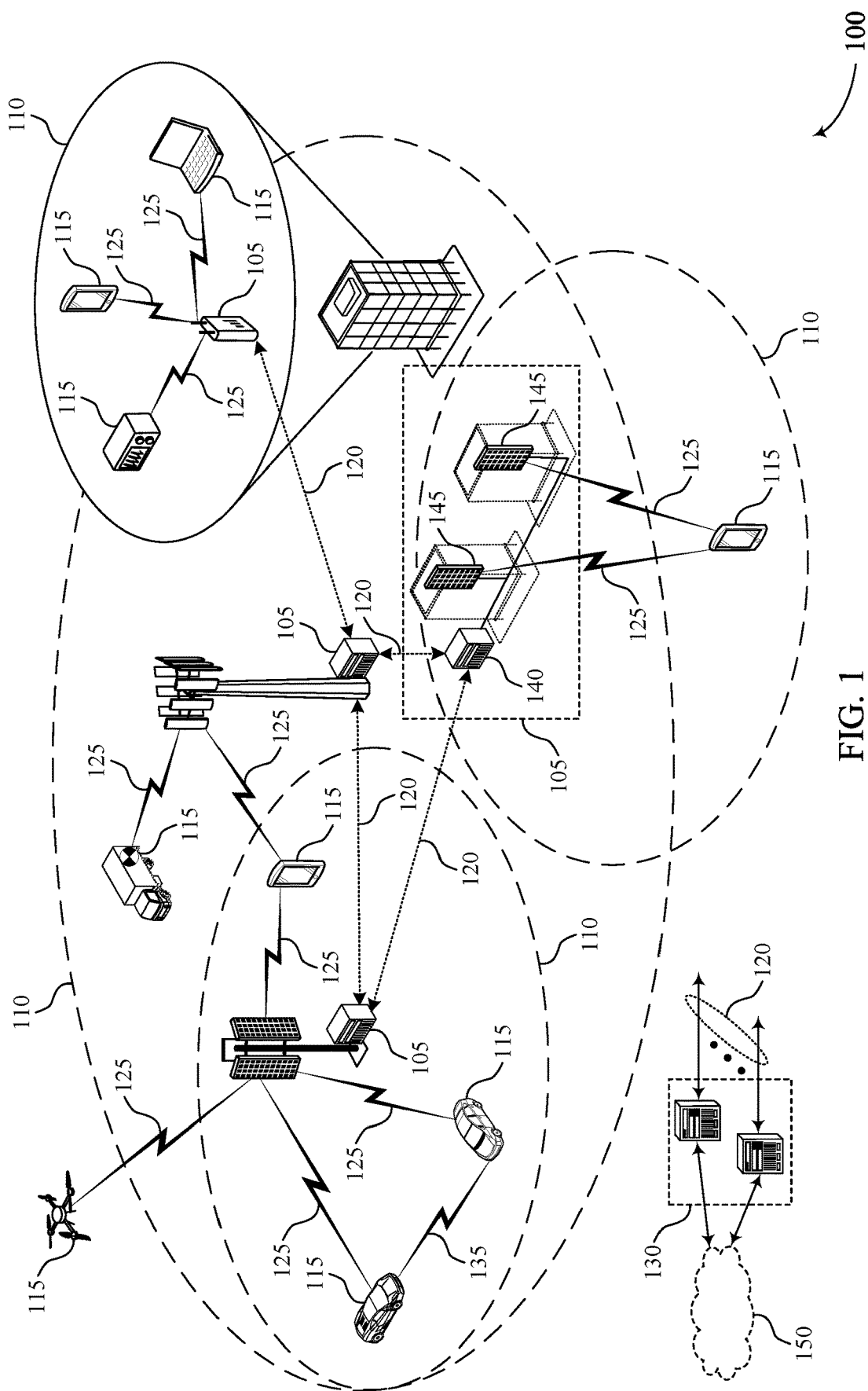
FIG. 1 illustrates an example of a system for wireless communications that supports sidelink beam management in accordance with aspects of the present disclosure.

A wireless communications system may support both access links and sidelinks for communications between wireless devices, in which an access link may refer to a communication link between a user equipment (UE) and a base station (e.g., a Uu interface), and a sidelink may refer to any communication link between similar wireless devices (e.g., a PC5 communication link between UEs, or a backhaul communication link between base stations). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. As demand for sidelink communication increases (e.g., due to increased V2X demand for autonomous and semi-autonomous vehicles or D2D communication between Internet-of-Things (IoT) devices), techniques to enhance throughput and reliability of sidelink channels may be desirable.

In some deployments, which may be referred to as mode-1 deployments, a serving base station may control the resource allocation for the access link and sidelink. Thus, in order to provide a sidelink communication, a transmitting UE and one or more receiving UEs of the sidelink communications may receive an associated resource grant from the serving base station (e.g., in a downlink control information (DCI) transmission via an access link of each of the sidelink UEs). In some cases, a UE is configured to support beamforming for communications between the UE and a base station, but is configured to support omni-directional transmission and reception for communications between one or more UEs. In such cases, a transmitting sidelink UE transmitting the resource grant will indicate time and frequency resource configuration for the sidelink UEs, but the resource grant will not include beam information because sidelink communications is not performed with beams.

In some implementations, omni-directional sidelink transmissions result in low throughput. To improve throughput and reliability of sidelink communications, flexible beam management may be implemented to support multi-beam operations, or multi-panel operations, or a combination thereof. A system that supports multi-beam and multi-panel operations may increase throughput and reliability because beam-diversity at transmitting UEs may be implemented.

Prior to a base station transmitting scheduling information regarding a sidelink transmission, a UE may be configured to transmit an indication to a base station indicating beam information. For example, a transmitting UE may transmit an indication to the base station indicating beam shapes and panel orientations of the UE, or the UE may indicate one or more pairs of spatially separated transmission beams at the UE, or the UE may indicate a beam report of the transmission beams to the base station, or a combination thereof. The base station may schedule sidelink communications between two UEs based on the beam information indicated by the transmitting UE. The base station may schedule more than one transmission beam for simultaneous transmission from the transmitting UE to a receiving UE for sidelink communications which may further improve throughput.

In some cases, a beam training procedure is implemented to train the transmission and reception beams of the UEs prior to sidelink communications. Beam training may introduce latency to sidelink communication scheduling. To lower the latency caused by beam training, multiple beams, or antenna panels, or a combination thereof may be trained simultaneously by orthogonalizing the sidelink transmissions via code division multiplexing (CDM) or frequency division multiplexing (FDM).

Particular aspects of the subject matter described herein may be implemented to realize one or more advantages. The described techniques may support improvements in sidelink communications by increasing throughput and improving reliability, among other advantages. As such, supported techniques may include improved network operations and, in some examples, may promote network efficiencies, among other benefits.

Aspects of the disclosure are initially described in the context of wireless communications systems. Aspects are then described with respect to sidelink beamforming and process flows. Aspects of the disclosure are further illustrated by and described with reference to apparatus diagrams, system diagrams, and flowcharts that relate to sidelink beam management.

FIG. 1 illustrates an example of a wireless communications system 100 that supports sidelink beam management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the radio resource control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some systems (e.g., systems operating using millimeter wave (mmW) frequency ranges) may support beamformed sidelink transmissions to improve throughput and reliability. In some cases, a device may support multi-beam, or multi-panel operations, or a combination thereof which may allow more than one sidelink transmission to occur at the same time. In some cases, flexible beam management for the beamformed sidelink communications is implemented to manage the beams. A transmitting UE may indicate transmission beam information to the base station, and the base station may use the transmission beam information to schedule sidelink transmissions as part of a beam management procedure. The beam management procedure may allow a transmitting UE to update transmission beam information based on the mobility of the sidelink UEs and other environmental factors. In some cases, beam training procedures may be implemented to refine the sidelink beams, where support for multi-panel and multi-beam operation may allow for multiple beams to be trained simultaneously.

Figure 2:
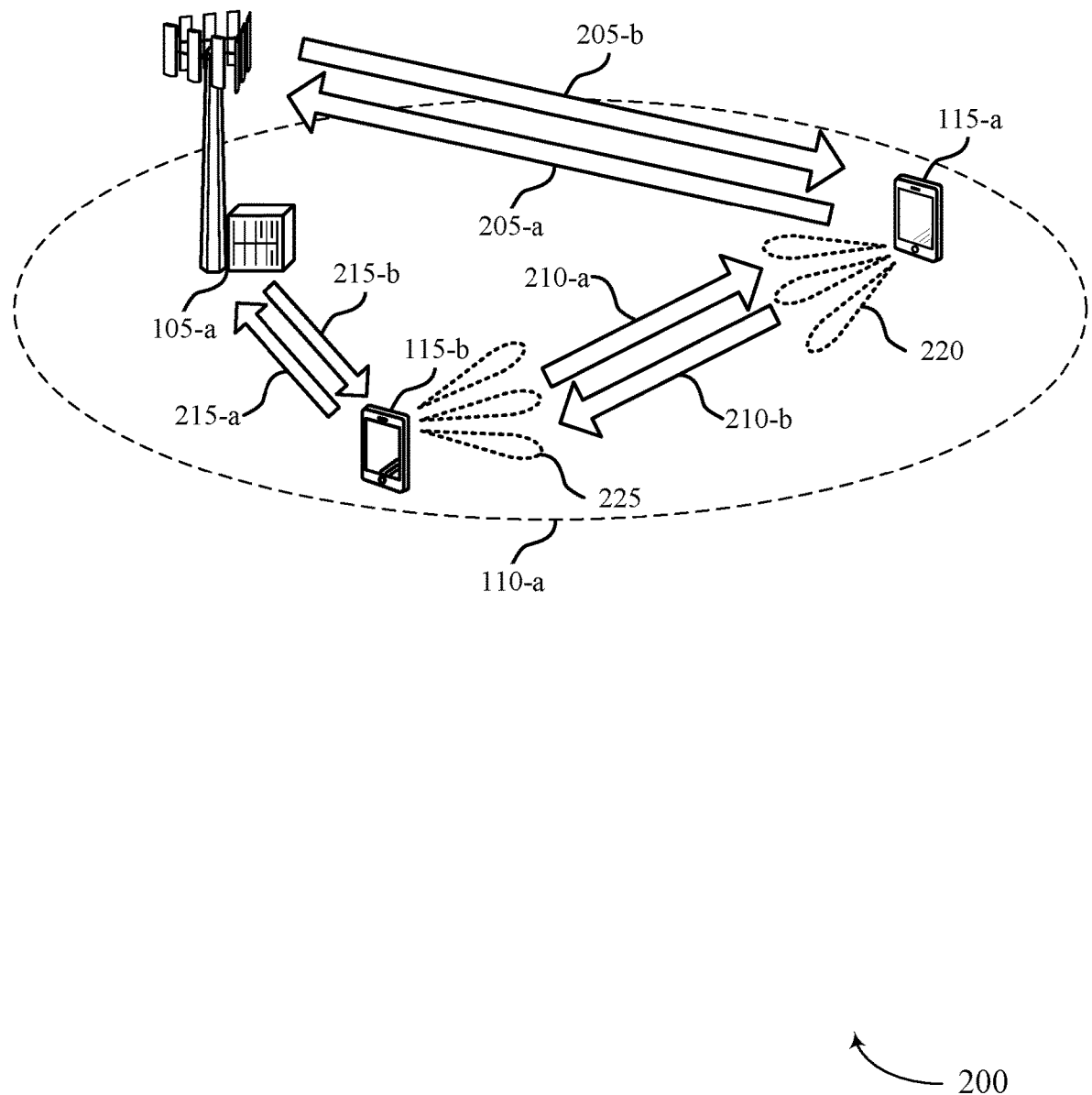
FIG. 2 illustrates an example of a system for wireless communications that supports sidelink beam management in accordance with aspects of the present disclosure.

FIG. 2 illustrates an example of a wireless communications system 200 that supports sidelink beam management in accordance with aspects of the present disclosure. The wireless communications system 200 may include base station 105-a and UEs 115-a and 115-b, which may be examples of a base station 105 and UEs 115 as described with reference to FIG. 1. Base station 105-a may serve a geographic coverage area 110-a. In some cases, base station 105-a may implement a flexible beam-management scheme for sidelink communications. For example, base station 105-a may schedule sidelink communications between UEs 115-a and 115-b based on beam information received from transmitting UE 115-a. Additionally or alternatively, other wireless devices, such as UEs 115-*a*, and 115-*b*, or some combination of these UEs 115, may implement a beam management procedure for sidelink communications.

In some examples, base station 105-*a* may also be considered a controlling UE, where the controlling UE acts as the scheduling entity for the sidelink communications with the UEs 115. That is, the sidelink communications may be controlled (e.g., coordinated, scheduled, allocated, etc.) by a controlling UE with respect to the sidelink communications being performed between UE 115-*a* and UE 115-*b*. Accordingly, a controlling UE may schedule and allocate the appropriate resources and convey those resources to the UEs 115. In some cases, base station 105-*a* may be considered a controlling UE when the controlling UE and the UE 115-*a* (e.g., and one or more other UEs served or otherwise controlled by the controlling UE) are out of base station coverage (e.g., such as a programmable logic controller (PLC) in an industrial Internet-of-Things (IIoT) scenario). The controlling UE may thus be designated as a master or anchor UE, and may act as the scheduling entity for the UEs 115 and any other UEs controlled by the controlling UE.

In conventional systems, a UE 115 may be configured to transmit and receive beamformed signals when communicating with a base station 105 and transmit and receive omni-directional signals when communicating with another UE 115. Omni-directional transmissions may decrease the throughput of a network. To increase throughput and improve reliability of sidelink communications, UEs 115 may be configured to support transmitting sidelink communications on one or more transmission beams. In some cases, one or more UEs 115 communicating over a sidelink are mobile which may impact the beams being used for sidelink communications between the UEs 115. Multi-beam and multi-panel operations may be supported to increase reliability of sidelink transmissions by implementing beam-diversity and supporting the option for simultaneous transmissions.

For example, a UE 115 may be configured with multiple antennas panels. In some cases, a UE 115 may include an antenna panel located at a front end, back end, or at the sides of the UE 115, or a combination thereof. The panels may be directed to different directions. The multiple antenna panels may allow a UE 115 to support MU-MIMO and SU-MIMO such that a UE 115 may simultaneously transmit more than one beamformed signal to one or more UEs 115. In MU-MIMO, transmitter UE 115-*a* may transmit signals (e.g., data streams) to more than one UE 115 at the same time. In SU-MIMO, transmitter UE 115-*a* may transmit multiple signals (e.g., data streams) to one UE 115 simultaneously. When transmissions are transmitted simultaneously from a transmitting UE 115, the beams may have high orthogonality and may be spatially separated to mitigate interference of the simultaneous transmissions. In some implementations, the simultaneous sidelink transmissions are orthogonalized via CDM or FDM (e.g., CDM/sequence or FDM instead of TDM). In some implementations, a set of transmission beams that are used simultaneously to transmit sidelink communications may be referred to as a pair of transmission beams.

Sidelink transmissions may be transmitted over beams from different antenna panels. For example, transmitting UE 115-*a* may transmit a first data stream from a side panel and another data stream from a front end panel. Transmitting simultaneous transmissions from different panels may provide antenna-diversity to mobile UEs 115. For example, transmitting UE 115-*a* transmits the same data stream to receiving UE 115-*b* over multiple beams simultaneously. At one instance, receiving UE 115-*b* may receive a data stream from a beam transmitted from a side panel of transmitting UE 115-*a*. The receiving UE 115-*b* or transmitting UE 115-*a*, or both may move and the receiving UE 115-*b* may receive the same data stream at a second instance from a beam transmitted from the front end of the transmitting UE 115-*b*. In some cases, receiving UE 115-*b* receives both data streams simultaneously. Transmitting the same data stream over different beams at the same time may improve reliability of sidelink communications. In some cases, the two transmissions may be transmitted over different beams but with the same antenna panel.

In some cases, different data streams may be transmitted over different beams at the same time. For example, transmitting UE 115-*a* transmits a first data stream over a first beam and transmits a second data stream over a second beam at the same time. Receiving UE 115-*b* may receive the two data streams simultaneously. In some cases, the beams may be transmitted using different antenna panels. In other cases, the beams may be transmitted using the same antenna panel. Utilizing different panels for simultaneous transmissions may lower peak-to-average-power ratio (PAPR) and maximum power reduction (MPR) as each antenna panel is associated with a different power amplifier (PA).

To perform sidelink communications, the system may support mode 1 scheduling where a base station 105 may explicitly schedule the sidelink transmissions. In conventional systems, a base station 105 may schedule sidelink communications by indicating time and frequency resources to one or both of the sidelink UEs 115. In systems that utilize beamforming for sidelink transmissions, a base station 105 may indicate beam identifiers (IDs), time resources, and frequency resources for one or more sidelink transmissions to one or both of the sidelink UEs. 115. The base station 105 may indicate the transmission beams to be used for sidelink communications via DCI, RRC, or a MAC control element (MAC-CE).

To support beamformed sidelink transmissions and mode 1 scheduling, beam management procedures may be implemented. A beam management procedure may be a procedure in which beams are trained, or beam information is indicated to a base station 105 from a UE 115, or a combination thereof. In some implementations, beam management procedures may be flexible such that transmission or reception beam information may be updated as UEs 115 move and as cell conditions change. A base station 105 may schedule sidelink communications based on the beam management procedures.

For example, to support mode 1 SU/MU-MIMO scheduling on sidelink, a transmitting UE 115 may indicate to the base station 105 which transmission beams are spatially well-separated. In some cases, the transmitting UE 115 may indicate the complete beam shapes and panel orientations of the transmitting UE 115. In some implementations, the transmitting UE 115 may indicate a beam shape per beam ID per antenna panel. Indicating the beam-shapes and panel orientations to the base station 105 may allow the base station 105 to effectively schedule sidelink transmissions. Panel orientation may refer to an antenna panel's geometric location within a UE 115 which may be related to the local coordination system (LCS) of the UE 115. In some cases, indicating beam-shape and panel orientation information to the base station 105 may allow the base station 105 to effectively mitigate interference. In this case, the transmitting UE 115 may indicate all beam related information to the base station, including information related to pairs of transmission beam that are spatially well separated, and pairs of transmission beams that are not spatially well separated.

In other cases, the transmitting UE 115 may indicate to the base station 105 pairs of transmission beams that are spatially well separated. The transmitting UE 115 may indicate the pair of spatially separated transmission beams with beam IDs. This indication my result in low overhead which may allow for frequent updates of beam pairs as conditions of the cell change and the sidelink UEs 115 move. Indicating the spatially well separated beams may allow the transmitting UE 115 to be more flexible with beams shapes, or beam codebook, or a combination thereof as the beams may be changed and updated to the base station 105 frequently.

In some other cases, the transmitting UE 115 may not transmit beam information to the base station 105. Instead, the base station 105 may determine which transmission beams are separated based on beams reports. A receiving UE 115 may perform beam related measurements and generate a corresponding sidelink group-based beam report. The report may include performance metrics such as rank, signal-to-interference-plus-noise ratio (SINR), spectrum efficiency, cross-beam interference, etc., or any combination thereof. The receiving UE 115 may transmit the measurement report to the base station 105. The base station 105 may compare the sidelink beam reports across pairs to determine a favorable pair of transmission beams.

For example, transmitting UE 115-a may indicate beam information to base station 105-a via access link 205-a. In some implementations, receiving UE 115-b indicates beam information to base station 105-a via access link 215-a. Base station 105-a may transmit the sidelink schedule to transmitting UE 115-a and receiving UE 115-b based on the beam information received from transmitting UE 115-a, or receiving UE 115-b, or a combination thereof where the sidelink scheduling indication may include beam IDs, and time and frequency resources for sidelink transmissions. Transmitting UE 115-a and receiving UE 115-b may communicate over sidelinks 210-a and 210-b according to the received schedule over transmission beams 220 and receive beams 225. In some cases, transmitting UE 115-a may transmit over multiple beams simultaneously. Simultaneous beamformed transmissions and flexible beam-management procedures may increase the throughout and reliability of sidelink communications.

Figure 3:
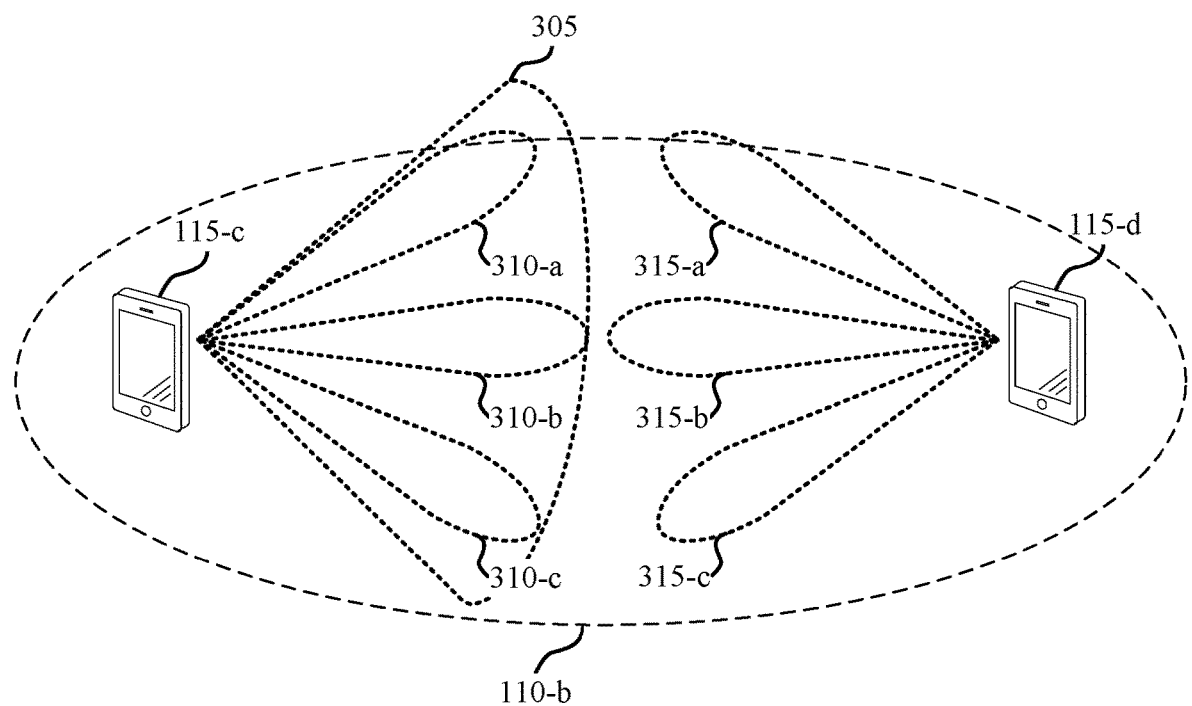
FIG. 3 illustrates an example of sidelink beamforming that supports sidelink beam management in accordance with aspects of the present disclosure.

FIG. 3 illustrates an example of sidelink beamforming 300 that supports sidelink beam management in accordance with aspects of the present disclosure. The sidelink beamforming 300 may include UEs 115-c and 115-d, which may be examples of UEs 115 as described with reference to FIGS. 1 and 2. UEs 115 may be in a geographic coverage area 110-a. In some cases, UEs 115-c and 115-d may implement a flexible beam management scheme for sidelink communications. For example, UE 115-c may transmit beam information to a base station, or perform beam training, or a combination thereof. Additionally or alternatively, other wireless devices, such as UE 115-d may implement a beam management procedure for sidelink communications.

Beam training may be a procedure used to refine transmission and reception beams and may be referred to as a beam management procedure. There may be different steps to beam training, such as P1, P2, and P3. During P1, a base station may transmit an indication of a wide beam to a transmitting UE 115. For example, a base station may transmit an indication to transmitting UE 115-c to use wide beam 305. During P2, the transmitting UE 115 may divide the indicated wide beam into some number of narrow beams, where the narrow beams may fit within the wide beam. For example, narrow transmission beams 310 fit in wide transmission beam 305. The transmitting UE 115 may transmit on each of the narrow transmission beams to the receiving UE 115. The receiving UE 115 may receive each of the narrow transmission beams on all reception antenna panels or on a subset of antenna panels. The receiving UE 115 may measure the quality of each transmission beam based on reference signal received power (RSRP), SINR, etc. The receiving UE 115 may report the measurements to the transmitting UE 115, or to the base station, or a combination thereof. In some cases, the receiving UE 115 may transmit an indication of one or more transmission beams (e.g., one or more best transmission beams) to the transmitting UE 115, or the base station, or a combination thereof. The base station, or the transmitting UE 115, or a combination thereof may determine one or more transmission beams (e.g., one or more best transmission beams) based on the measurements, or preferred transmission beam indicated by the receiving UE 115, or a combination thereof. The one or more selected narrow transmission beams may also be selected based on cell conditions. For example, narrow transmission beams 310-a and 310-c may be selected.

During P3, a transmitting UE 115 may transmit to the receiving UE 115 on the one or more selected narrow transmission beams for some amount of time. For example, transmitting UE 115-c transmits to receiving UE 115-d over narrow beams 310-a and 310-c. The receiving UE 115 may receive the signal from the selected transmission beams using different panel and beam configurations at the receiving UE 115. For example, the receiving UE 115 may receive signals on a pair of reception beams, on one reception beams, on more than two reception beams, on multiple beams from different antenna panels, on multiple reception beams from the same panels, etc. For example, receiving UE 115-d may receive the transmissions on beams 315-a, 315-b, and 315-c. The receiving UE 115 may measure each of the signals received from the selected transmission beam on each reception beam and report a measurement report to the base station, or transmitting UE 115, or a combination thereof. In some cases, the receiving UE 115 indicates one or more preferred reception beams to the base station, or transmitting UE 115, or a combination thereof. The base station, or transmitting UE 115, or a combination thereof may select one or more reception beams based on the measurements, or indication of a preferred beam, or a combination thereof from the receiving UE 115. The one or more preferred reception beams may be selected based on cell conditions such as other communications occurring nearby to avoid potential interference from or to neighboring devices.

In conventional systems, a UE 115 may train transmission or reception beams such that each panel and beam is individually trained at separate times which may result in large beam-sweeping overhead and latency. For example, a transmitting UE 115 sweeps the transmission beams in P1 or P2 over different times resulting in latency to the system due to beam training. Some other systems may reduce latency by simultaneously training multiple beams, or panels, or a combination thereof. For example, a transmitting UE 115 may sweep more than one transmission beam over the same time during P1, or P2, or a combination thereof via CDM or FDM. In some cases, the UE 115 may train multiple beams simultaneously, where each beam is from a separate antenna panel. In some cases, if the number of beams to be swept in the same duration is greater than the number of available panels, then more than one beam may be sent from the same panel. In some cases, the transmitting UE 115 or the receiving UE 115 may indicate the beams to be trained simultaneously to the base station. In some other cases, base station may indicate the beams to be trained simultaneously to the transmitting UE 115, or receiving UE 115, or a combination thereof.

In some cases, simultaneous beam training is a separate beam management procedure than the mode 1 beam scheduling procedure as described in reference to FIG. 2. In some other cases, simultaneous beam training may be used with mode 1 beam scheduling. For example, the P1, or P2, or a combination thereof results may be transmitted to the base station and based on the beam information indicated by the transmitting UE 115 for mode 1 scheduling, the base station may determine the serving transmission beam pair for MIMO operation out of the top transmission beams from P1, or P2. In some cases, there may be N transmission beams if MIMO utilizes N layers, and in one example N=2. In some cases, the top beams may be wide beams (e.g., broad beams) from P1, if P2 results may not be available, and narrow beams from P2, if P2 results may be available. In some other cases, beam training may occur, from P1 to P3, and then the transmitting UE 115 may indicate beam information to the base station for mode 1 scheduling. In some other cases, the transmitting UE 115 may indicate beam information for mode 1 scheduling, and the base station may implement a beam training procedure prior to mode 1 scheduling.

Figure 4:
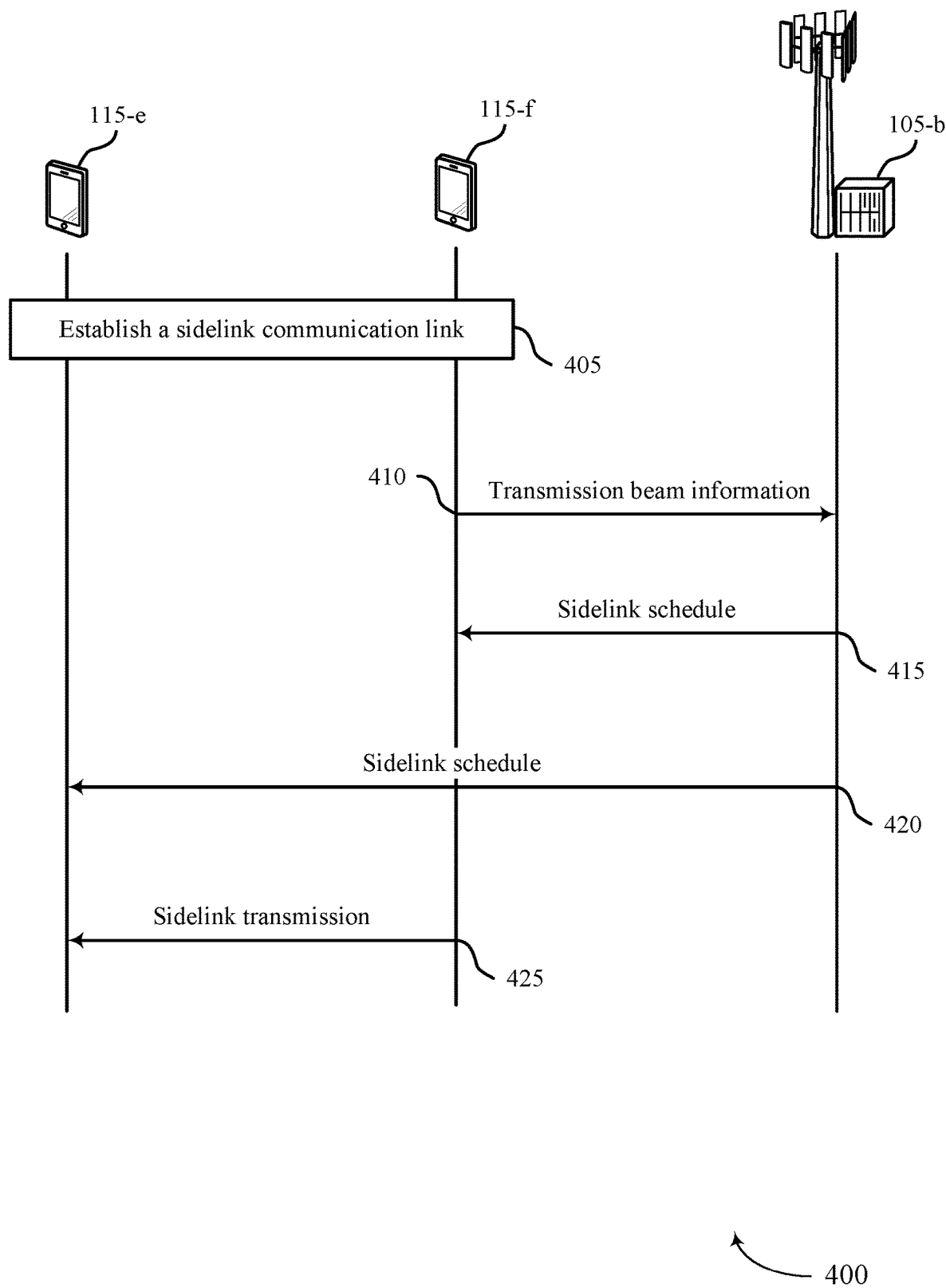
FIG. 4 illustrates an example of a process flow that supports sidelink beam management in accordance with aspects of the present disclosure.

FIG. 4 illustrates an example of a process flow 400 that supports sidelink beam management in accordance with aspects of the present disclosure. The process flow 400 may illustrate an example of a beam management procedure for sidelink transmissions. For example, base station 105-*b* may schedule sidelink transmissions for UEs 115-*e* and 115-*f* based on beam information received from the UEs 115. Base station 105-*b* and UEs 115-*e* and 115-*f* may be examples of the corresponding wireless devices described with reference to FIGS. 1 through 3. In some cases, instead of base station 105-*b* implementing the beam management procedure, a different type of wireless device (e.g., a UE 115) may perform beam management. Alternative examples of the following may be implemented, where some steps are performed in a different order than described or are not performed at all. In some cases, steps may include additional features not mentioned below, or further steps may be added.

At 405, transmitting UE 115-*f* and receiving UE 115-*e* may establish a sidelink communication link.

At 410, transmitting UE 115-*f* may transmit to base station 105-*b* transmission beam information. In some cases, beam information may include a set of beam parameters for a set of transmission beams for sidelink communications between transmitting UE 115-*f* and receiving UE 115-*e*. In some cases, transmitting the set of beam parameters may include transmitting beam shape information for the set of transmission beams. In some cases, transmitting the set of beam parameters may include transmitting panel orientation for one or more antenna panels associated with the set of transmission beams. In some cases, transmitting the set of beam parameters may include transmitting geometric location of one or more antenna panels associated with the set of transmission beams. In some cases, transmitting the set of beam parameters may include transmitting a relative location of one or more antenna panels associated with the set of transmission beams with respect to transmitting UE 115-*f*. In some cases, the set of beam parameters may include beam identifiers for the set of transmission beams, codebook information for the set of transmission beams, beam shape information specific to a beam identifier for each antenna panel of the first UE, etc. In some examples, the base station may be an example of a cellular base station or a controlling UE.

In some cases, beam information may include sets of beam pairs. For example, the transmitting UE 115-*f* may transmit, to base station 105-*b*, a set of beam pairs for a set of transmission beams for sidelink communications between transmitting UE 115-*f* and receiving UE 115-*e*, where each of the set of beam pairs may corresponds to a spatially separated pair of transmission beams at transmitting UE 115-*f*. Transmitting the set of beam pairs may include transmitting respective transmission beam identifiers for each pair of transmission beams of the set of beam pairs.

At 415 and 420, base station 105-*b* may transmit a sidelink schedule to transmitting UE 115-*f*, or receiving UE 115-*e*, or a combination thereof. In some cases, receiving the sidelink schedule at the UEs 115 may include receiving transmission beam information for a sidelink message to be transmitted from transmitting UE 115-*f* to receiving UE 115-*e*, the transmission beam information may include an indication of one or more transmission beams for transmission of the sidelink message. In some cases, the transmission beam information is received via DCI, RRC signaling, or a MAC-CE. In some cases, the transmission beam information may include beam identifiers, and a time-frequency resource configuration for each of the one or more transmission beams.

At 425, transmitting UE 115-*f* may transmit the sidelink message to receiving UE 115-*e* using the one or more transmission beams based on the transmission beam information.

Figure 5:
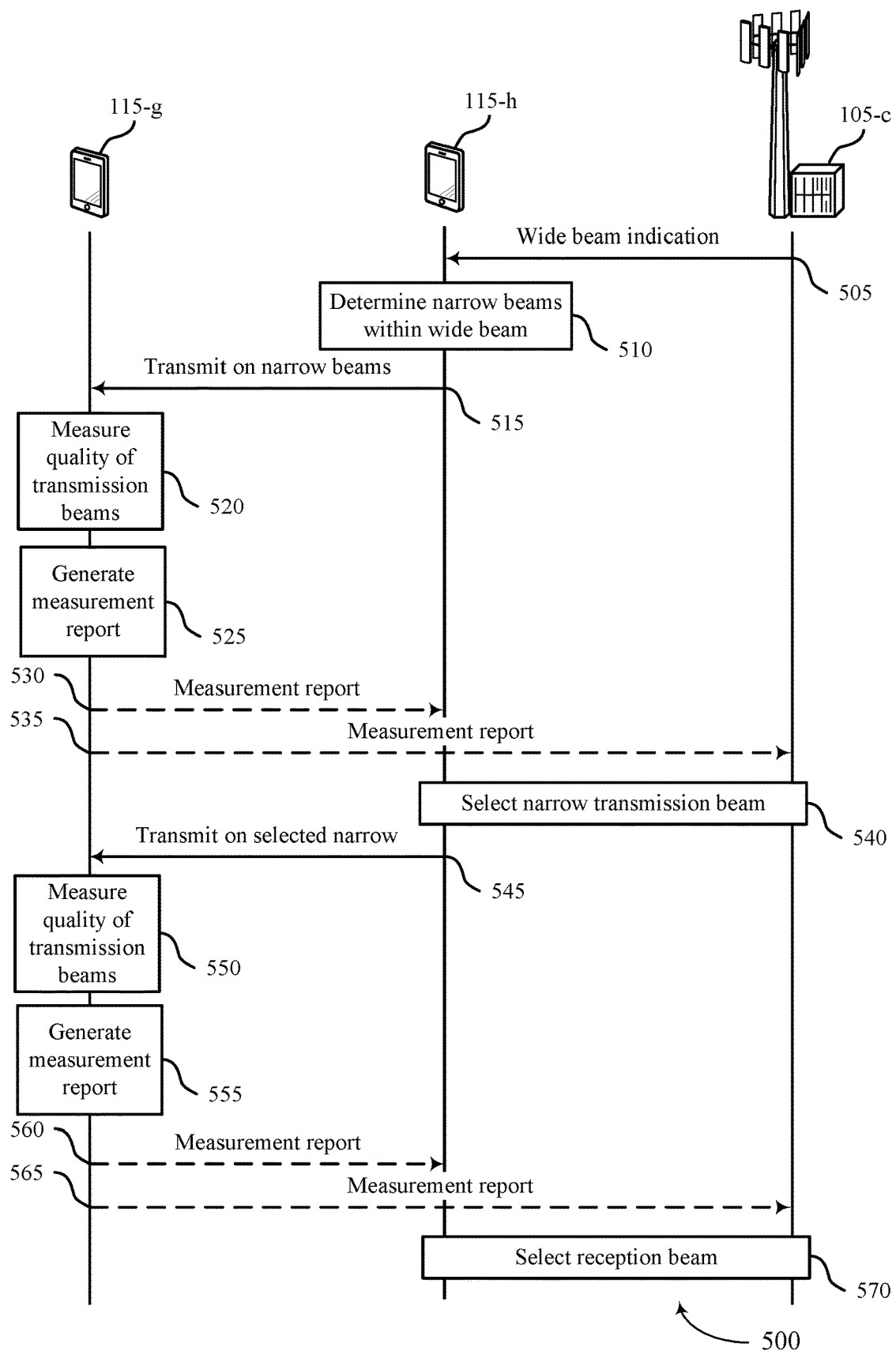
FIG. 5 illustrates an example of a process flow that supports sidelink beam management in accordance with aspects of the present disclosure.

FIG. 5 illustrates an example of a process flow 500 that supports sidelink beam management in accordance with aspects of the present disclosure. The process flow 500 may illustrate an example beam-training scheme for refining beams for sidelink transmissions. For example, base station 105-*c* may indicate a beam-training procedure to UEs 115-*g* and 115-*h*. Base station 105-*c* and UEs 115-*g* and 115-*h* may be examples of the corresponding wireless devices described with reference to FIGS. 1 through 4. In some cases, instead of base station 105-*c* implementing the beam-training scheme, a different type of wireless device (e.g., a UE 115) may perform beam training. Alternative examples of the following may be implemented, where some steps are performed in a different order than described or are not performed at all. In some cases, steps may include additional features not mentioned below, or further steps may be added.

As described in reference to FIG. 3, a system may perform beam training to refine one or more transmission and reception beams. In some cases, beam training may be performed such that multiple beams, or multiple panels, or a combination thereof may be trained simultaneously. In some cases, base station 105-*c* may transmit a beam training information for a sidelink beam training procedure between transmitting UE 115-*h* and receiving UE 115-*g*. The beam training information may be transmitted to transmitting UE 115-*h*, or receiving UE 115-*g*, or a combination thereof. In some cases, the beam training information may be transmitted to transmitting UE 115-*h* and transmitting UE 115-*h* may relay the information to receiving UE 115-*g*. In some cases, transmitting the beam training information to receiving UE 115-*g* may include transmitting, to receiving UE 115-*g*, additional beam training information for a sidelink beam training procedure between the transmitting and receiving UEs 115-*g*, and 115-*h* based on antenna panel information received from the receiving UE 115-*g*, where the additional beam training information may indicate that the beam training procedure is for different antenna panels of receiving UE 115-g being used within a partially overlapping time period. In some cases, the additional beam training information may include some or all of the beam training information from the base station 105-c. Alternatively, the additional beam training information may include none of the beam training information from the base station 105-c.

At 505, base station 105-c may proceed according to P1 of a beam training procedure such that base station 105-c may transmit an indication of a wide beam to transmitting UE 115-h. At 510, transmitting UE 115-h may divide the indicated wide beam into some number of narrow beams, where the narrow beams may fit within the wide beam in accordance with P2 if the beam training procedure. At 515, transmitting UE 115-h may transmit on each of the narrow transmission beams to receiving UE 115-g. Receiving UE 115-g may receive each of the narrow transmission beams on all reception antenna panels or on a subset of antenna panels. In some cases, multiple transmission beams, or panels may be trained simultaneously. Each simultaneous transmission may be orthogonalized via CDM or FDM.

At 520, receiving UE 115-g may measure the quality of each transmission beam based on RSRP, SINR, etc. At 525, receiving UE 115-g may generate a measurement report of the narrow transmission beam measurements. The measurement report may indicate a rank indicator, SINR, a spectral efficiency, a cross-beam interference metric, or a combination thereof.

At 530 and 535, receiving UE 115-g may transmit the measurements report to transmitting UE 115-g, or to base station 105-c, or a combination thereof. In some cases, receiving UE 115-g may transmit an indication of one or more transmission beams (e.g., one or more best transmission beams) to transmitting UE 115-h, or base station 105-c, or a combination thereof.

At 540, base station 105-c, or transmitting UE 115-h, or a combination thereof may select one or more narrow transmission beams (e.g., best narrow transmission beams) based on the measurements, or preferred transmission beam indicated by receiving UE 115-g, or a combination thereof. The one or more selected narrow transmission beams may also be selected based on cell conditions to mitigate interference from or to neighboring devices.

At 545, transmitting UE 115-h may transmit to receiving UE 115-g on the one or more selected narrow transmission beams for some amount of time in accordance with P3 of the beam training procedure. Receiving UE 115-g may receive the signal from the selected transmission beams using different panel and beam configurations at the receiving UE 115. For example, receiving UE 115-g may receive signals on a pair of reception beams, on one reception beams, on more than two reception beams, on multiple beams from different antenna panels, on multiple reception beams from the same panels, etc. In some cases, multiple reception beams, or panels may be trained simultaneously.

At 550, receiving UE 115-g may measure each of the signals received from the selected transmission beams on each reception beam. At 555, receiving UE 115-g may generate a report a measurement report of the reception beam measurements. The measurement report may indicate a rank indicator, SINR, a spectral efficiency, a cross-beam interference metric, or a combination thereof.

At 560 and 565, receiving UE 115-g may transmit the measurement report to base station 105-c, or transmitting UE 115-h, or a combination thereof. In some cases, receiving UE 115-g may indicate one or more preferred reception beams to base station 105-c, or transmitting UE 115-h, or a combination thereof.

At 570, base station 105-c, or transmitting UE 115-h, or a combination thereof may select one or more reception beams based on the measurements, or indication of a preferred beam, or a combination thereof from receiving UE 115-g. The one or more preferred reception beams may be selected based on cell conditions such as other communications occurring nearby to avoid potential interference from or to neighboring devices.

Figure 6:
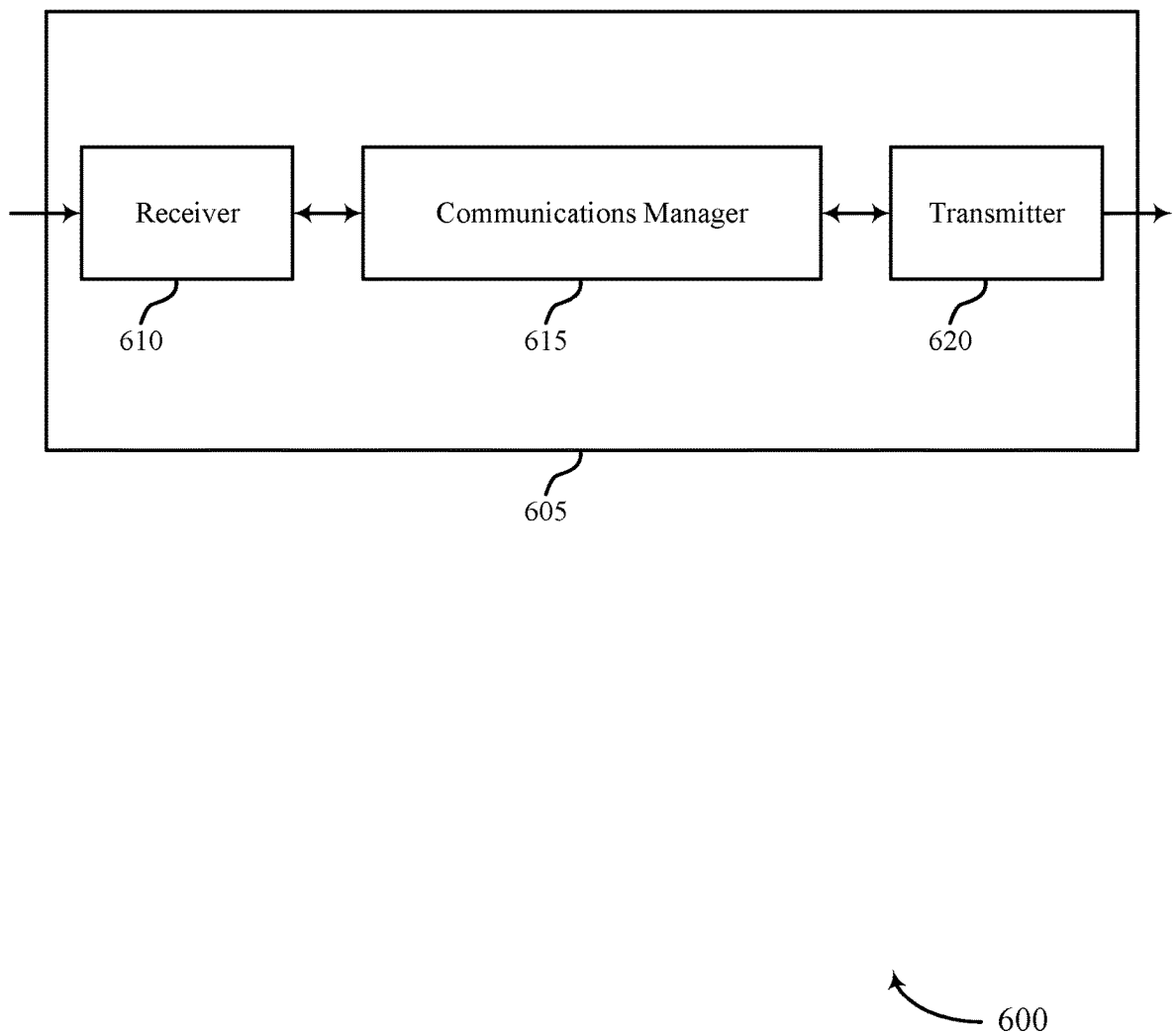
FIGS. 6 and 7 show block diagrams of devices that support sidelink beam management in accordance with aspects of the present disclosure.

FIG. 6 shows a block diagram 600 of a device 605 that supports sidelink beam management in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sidelink beam management). Information may be passed on to other components of the device 605. The receiver 610 may be an example of aspects of the transceiver 920 described with reference to FIG. 9. The receiver 610 may utilize a single antenna or a set of antennas.

The communications manager 615 may establish a sidelink communications link with a second UE, receive, from a base station, transmission beam information for a sidelink message to be transmitted from the first UE to the second UE, the transmission beam information including an indication of one or more transmission beams for transmission of the sidelink message, and transmit the sidelink message to the second UE using the one or more transmission beams based on the transmission beam information. The communications manager 615 may also establish a sidelink communications link with a second UE, receive, from a base station, beam training information for a sidelink beam training procedure between the first UE and the second UE, and perform the sidelink beam training procedure with the second UE based on the beam training information. The communications manager 615 may also establish a sidelink communications link with a transmit UE, transmit, to a base station, information related to beamformed communications via the sidelink communications link between the transmit UE and the receive UE, and receive a beamformed transmission from the transmit UE via the sidelink communications link based on the information. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the device 605 to implement beam-management procedures, and more specifically to indicate beam information to a base station that the base station may use for scheduling sidelink communications to increased sidelink communication reliability and increase throughput. For example, the device 605 may indicate one or more beam parameters to the base station, and the base station may transmit and indicates of a schedule for sidelink communications based on the beam information where the schedule indication may include beam information.

Based on implementing the beam management procedure such that multi-beam and multi-panel transmissions may be supported as described herein, a processor of a UE 115 (e.g., controlling the receiver 610, the transmitter 620, or the transceiver 920 as described with reference to FIG. 9) may increase reliability and throughput associated with sidelink communications because sidelink transmissions may occur over one or more transmissions beams, or antennas panels, or a combination thereof such that multiple sidelink transmissions may occur simultaneously.

Figure 7:
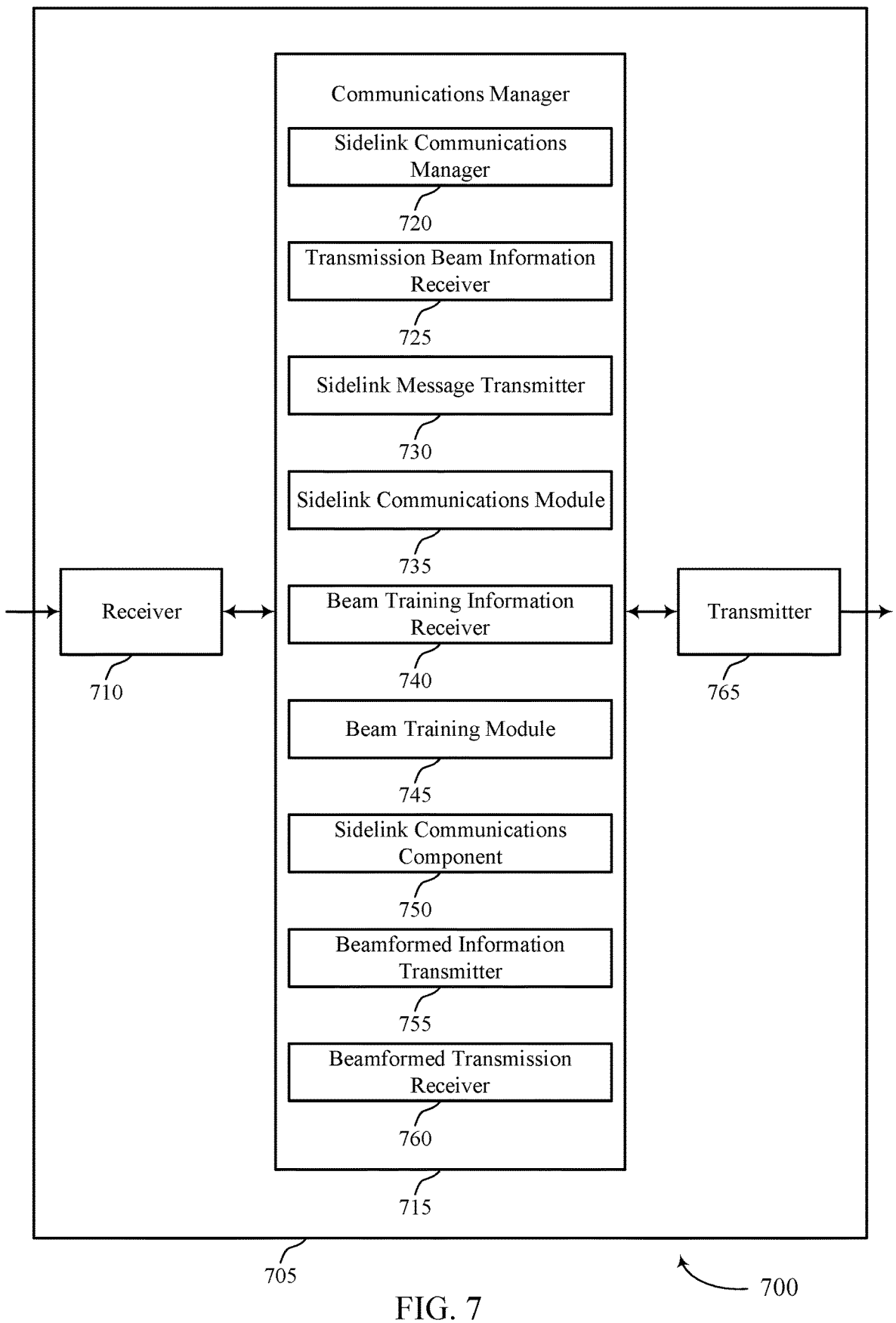

FIG. 7 shows a block diagram 700 of a device 705 that supports sidelink beam management in accordance with aspects of the present disclosure. The device 705 may be an example of aspects of a device 605, or a UE 115 as described herein. The device 705 may include a receiver 710, a communications manager 715, and a transmitter 765. The device 705 may also include a processor. Each of these components may be in communication with one another (e.g., via one or more buses).

The receiver 710 may receive information such as packets, user data, or control information associated with various information channels (e.g., control channels, data channels, and information related to sidelink beam management). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a sidelink communications manager 720, a transmission beam information receiver 725, a sidelink message transmitter 730, a sidelink communications module 735, a beam training information receiver 740, a beam training module 745, a sidelink communications component 750, a beamformed information transmitter 755, and a beamformed transmission receiver 760. The communications manager 715 may be an example of aspects of the communications manager 910 described herein.

The sidelink communications manager 720 may establish a sidelink communications link with a second UE. The transmission beam information receiver 725 may receive, from a base station, transmission beam information for a sidelink message to be transmitted from the first UE to the second UE, the transmission beam information including an indication of one or more transmission beams for transmission of the sidelink message. The sidelink message transmitter 730 may transmit the sidelink message to the second UE using the one or more transmission beams based on the transmission beam information.

The sidelink communications module 735 may establish a sidelink communications link with a second UE. The beam training information receiver 740 may receive, from a base station, beam training information for a sidelink beam training procedure between the first UE and the second UE. The beam training module 745 may perform the sidelink beam training procedure with the second UE based on the beam training information.

The sidelink communications component 750 may establish a sidelink communications link with a transmit UE. The beamformed information transmitter 755 may transmit, to a base station, information related to beamformed communications via the sidelink communications link between the transmit UE and the receive UE. The beamformed transmission receiver 760 may receive a beamformed transmission from the transmit UE via the sidelink communications link based on the information.

The transmitter 765 may transmit signals generated by other components of the device 705. In some examples, the transmitter 765 may be collocated with a receiver 710 in a transceiver module. For example, the transmitter 765 may be an example of aspects of the transceiver 920 described with reference to FIG. 9. The transmitter 765 may utilize a single antenna or a set of antennas.

Figure 8:
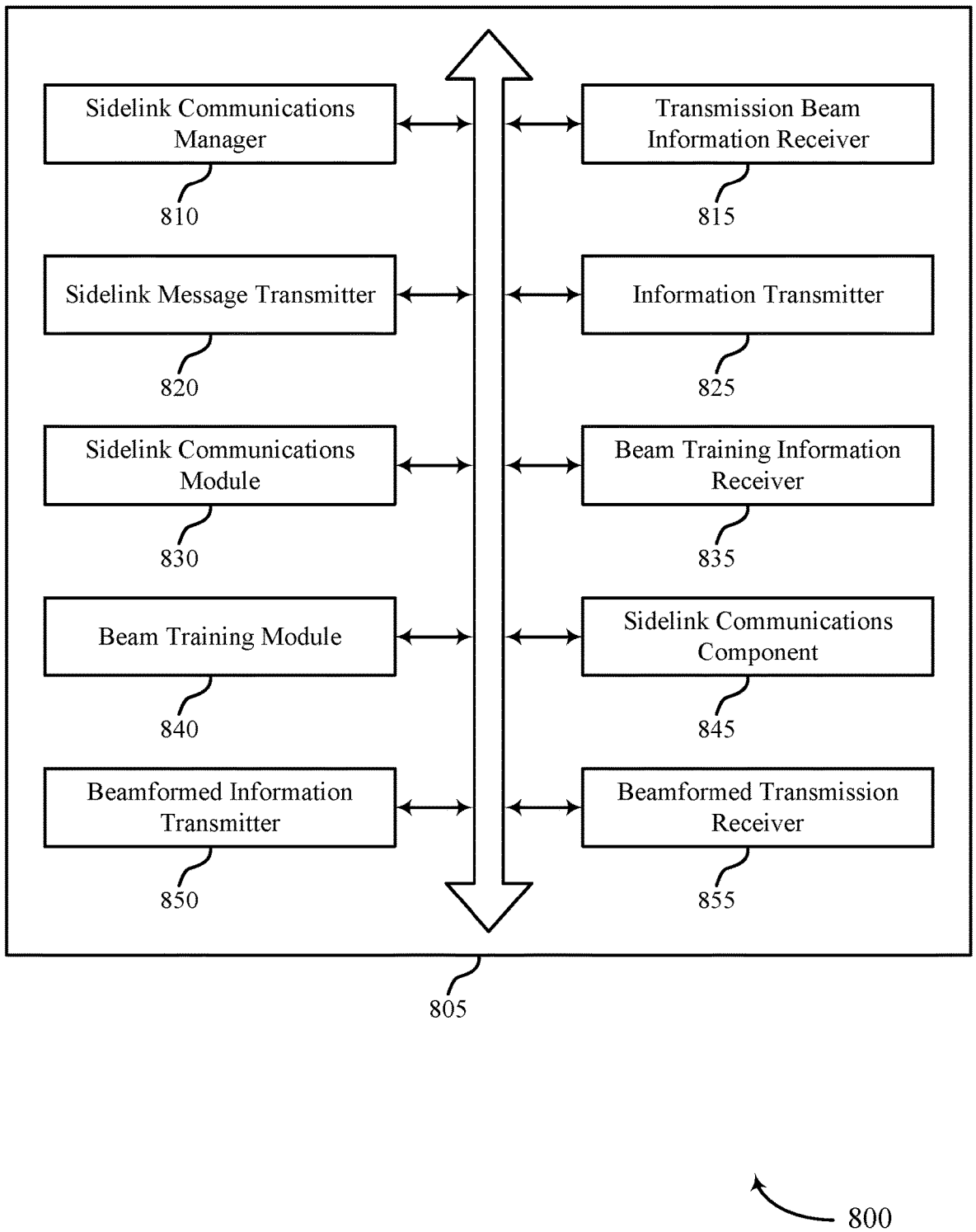
FIG. 8 shows a block diagram of a communications manager that supports sidelink beam management in accordance with aspects of the present disclosure.

FIG. 8 shows a block diagram 800 of a communications manager 805 that supports sidelink beam management in accordance with aspects of the present disclosure. The communications manager 805 may be an example of aspects of a communications manager 615, a communications manager 715, or a communications manager 910 described herein. The communications manager 805 may include a sidelink communications manager 810, a transmission beam information receiver 815, a sidelink message transmitter 820, an information transmitter 825, a sidelink communications module 830, a beam training information receiver 835, a beam training module 840, a sidelink communications component 845, a beamformed information transmitter 850, and a beamformed transmission receiver 855. Each of these modules may communicate, directly or indirectly, with one another (e.g., via one or more buses).

The sidelink communications manager 810 may establish a sidelink communications link with a second UE. The transmission beam information receiver 815 may receive, from a base station, transmission beam information for a sidelink message to be transmitted from the first UE to the second UE, the transmission beam information including an indication of one or more transmission beams for transmission of the sidelink message. In some cases, the first and second UEs are configured for MIMO communications via the sidelink communications link. In some examples, the transmission beam information receiver 815 may receive the transmission beam information via DCI, RRC signaling, or a MAC-CE. In some cases, the transmission beam information includes beam identifiers and a time-frequency resource configuration for each of the one or more transmission beams.

The sidelink message transmitter 820 may transmit the sidelink message to the second UE using the one or more transmission beams based on the transmission beam information. The sidelink communications module 830 may establish a sidelink communications link with a second UE. The beam training information receiver 835 may receive, from a base station, beam training information for a sidelink beam training procedure between the first UE and the second UE.

The beam training module 840 may perform the sidelink beam training procedure with the second UE based on the beam training information. In some examples, the beam training module 840 may receive, from the second UE, antenna panel information including a number of antenna panels and respective panel orientations for a set of antenna panels of the second UE. In some examples, the beam training module 840 may transmit, to the second UE, beam training information for a sidelink beam training procedure between the first UE and the second UE based on the antenna panel information, where the beam training information indicates that the sidelink beam training procedure is for different antenna panels of the second UE being used within a partially overlapping time period. In some examples, the beam training module 840 may concurrently transmit reference signals via multiple transmission beams at the first UE.

In some examples, the beam training module 840 may transmit a report of the sidelink beam training procedure to the base station based on transmission of the reference signals. In some examples, the beam training module 840 may receive the transmission beam information in response to the report. In some examples, the beam training module 840 may transmit, to the base station, an indication of one or more wide beams of the first UE for the sidelink beam training procedure for one or more narrow beams of the first UE for the sidelink beam training procedure. In some cases, the base station may include a cellular base station or a controlling UE.

In some examples, the beam training module 840 may receive additional beam training information from the base station, where the additional beam training information indicates to use different antenna panels at the second UE within a partially overlapping time period. In some examples, the beam training module 840 may transmit the additional beam training information to the second UE. In some cases, the beam training information indicates a set of transmission beams at the first UE. In some cases, the sidelink beam training procedure is performed simultaneously for multiple transmission beams in the set of transmission beams. In some cases, the sidelink beam training procedure is an orthogonalized beam training procedure according to one of CDM, sequence-based training, or FDM using different antenna panels of the first UE, or the same antenna panel of the first UE.

The sidelink communications component 845 may establish a sidelink communications link with a transmit UE. The beamformed information transmitter 850 may transmit, to a base station, information related to beamformed communications via the sidelink communications link between the transmit UE and the receive UE.

In some examples, transmitting, to the base station, a set of beam parameters for a set of reception beams for sidelink communications between the first UE and the second UE, where the set of beam parameters includes beam shape information for the set of reception beams, panel orientation for one or more antenna panels associated with the set of reception beams, geometric location of one or more antenna panels associated with the set of reception beams, a relative location of one or more antenna panels associated with the set of reception beams with respect to the first UE, beam identifiers for the set of reception beams, codebook information for the set of reception beams, beam shape information specific to a beam identifier for each antenna panel of the receive UE.

In some examples, the beamformed information transmitter 850 may transmit, to the base station, a set of beam pairs for a set of reception beams for sidelink communications between the first UE and the second UE, where each of the set of beam pairs corresponds to a spatially separated pair of reception beams at the receive UE.

In some examples, the beamformed information transmitter 850 may transmit, to the base station or to the transmit UE a beam report that indicates one or more measurement parameters for a pair of reception beams at the receive UE, where the one or more measurement parameters include a rank indicator, a signal to interference plus noise ratio, a spectral efficiency, a cross-beam interference metric, or any combination thereof.

The beamformed transmission receiver 855 may receive a beamformed transmission from the transmit UE via the sidelink communications link based on the information.

The information transmitter 825 may transmit, to the base station, a set of beam parameters for a set of transmission beams for sidelink communications between the first UE and the second UE, the set of transmission beams including the one or more transmission beams. In some examples, the information transmitter 825 may transmit beam shape information for the set of transmission beams. In some examples, the information transmitter 825 may transmit panel orientation for one or more antenna panels associated with the set of transmission beams. In some examples, the information transmitter 825 may transmit geometric location of one or more antenna panels associated with the set of transmission beams. In some examples, the information transmitter 825 may transmit a relative location of one or more antenna panels associated with the set of transmission beams with respect to the first UE. In some examples, the information transmitter 825 may transmit beam identifiers for the set of transmission beams.

In some examples, the information transmitter 825 may transmit codebook information for the set of transmission beams. In some examples, the information transmitter 825 may transmit beam shape information specific to a beam identifier for each antenna panel of the first UE. In some examples, the information transmitter 825 may transmit, to the base station, a set of beam pairs for a set of transmission beams for sidelink communications between the first UE and the second UE, where each of the set of beam pairs corresponds to a spatially separated pair of transmission beams at the first UE. In some examples, the information transmitter 825 may transmit respective transmission beam identifiers for each pair of transmission beams of the set of beam pairs.

In some examples, the information transmitter 825 may transmit, to the base station, measurement information associated with sidelink communications between the first UE and the second UE, where the transmission beam information is based on the measurement information. In some examples, the information transmitter 825 may transmit a beam report that indicates one or more measurement parameters for a pair of transmission beams at the first UE. In some cases, the one or more measurement parameters include a rank indicator, a signal to interference plus noise ratio, a spectral efficiency, a cross-beam interference metric, or any combination thereof.

Figure 9:
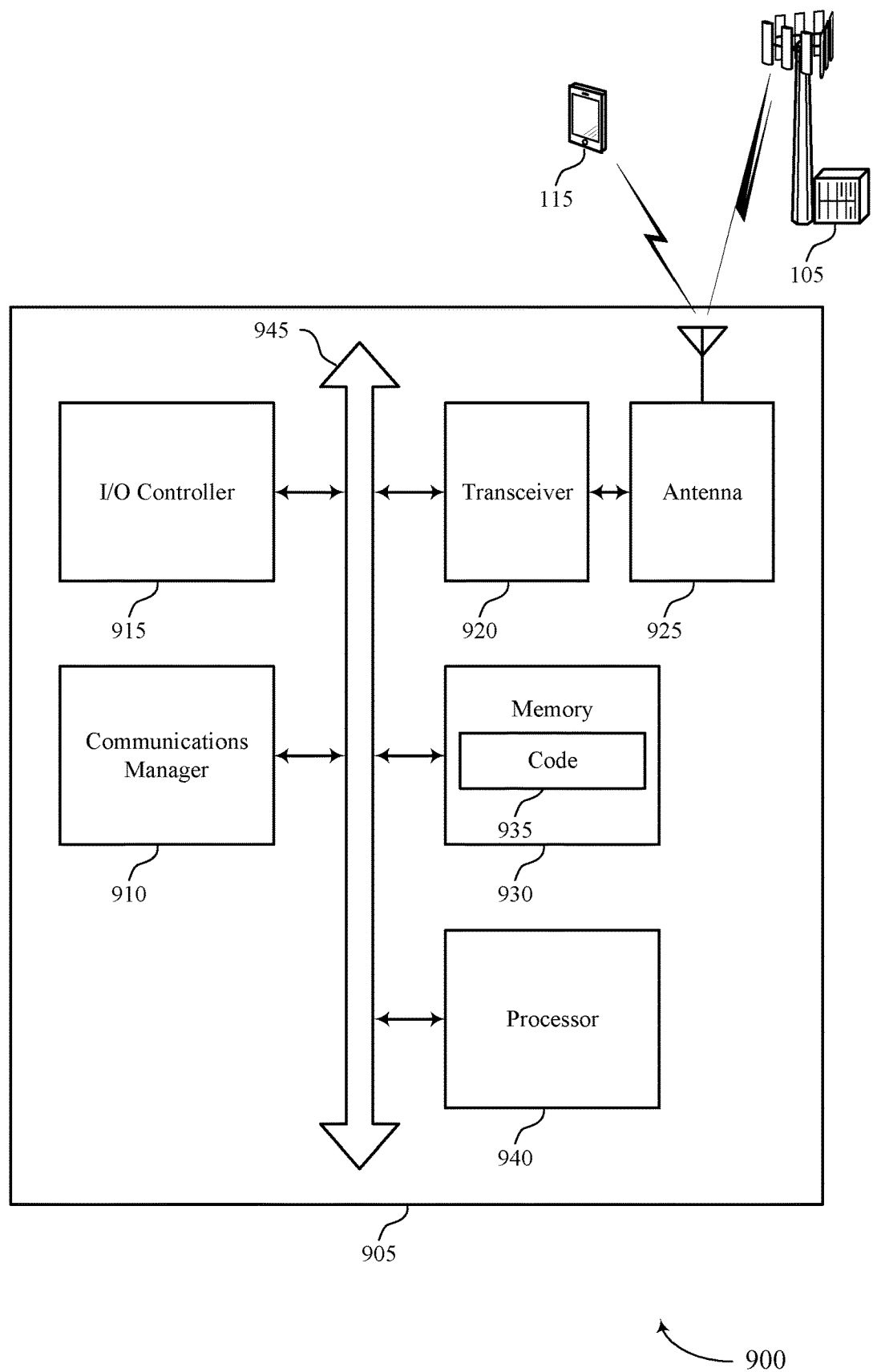
FIG. 9 shows a diagram of a system including a device that supports sidelink beam management in accordance with aspects of the present disclosure.

FIG. 9 shows a diagram of a system 900 including a device 905 that supports sidelink beam management in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may establish a sidelink communications link with a second UE, receive, from a base station, transmission beam information for a sidelink message to be transmitted from the first UE to the second UE, the transmission beam information including an indication of one or more transmission beams for transmission of the sidelink message, and transmit the sidelink message to the second UE using the one or more transmission beams based on the transmission beam information. The communications manager 910 may also establish a sidelink communications link with a second UE, receive, from a base station, beam training information for a sidelink beam training procedure between the first UE and the second UE, and perform the sidelink beam training procedure with the second UE based on the beam training information. The communications manager 910 may also establish a sidelink communications link with a transmit UE, transmit, to a base station, information related to beamformed communications via the sidelink communications link between the transmit UE and the receive UE, and receive a beamformed transmission from the transmit UE via the sidelink communications link based on the information.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink beam management).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
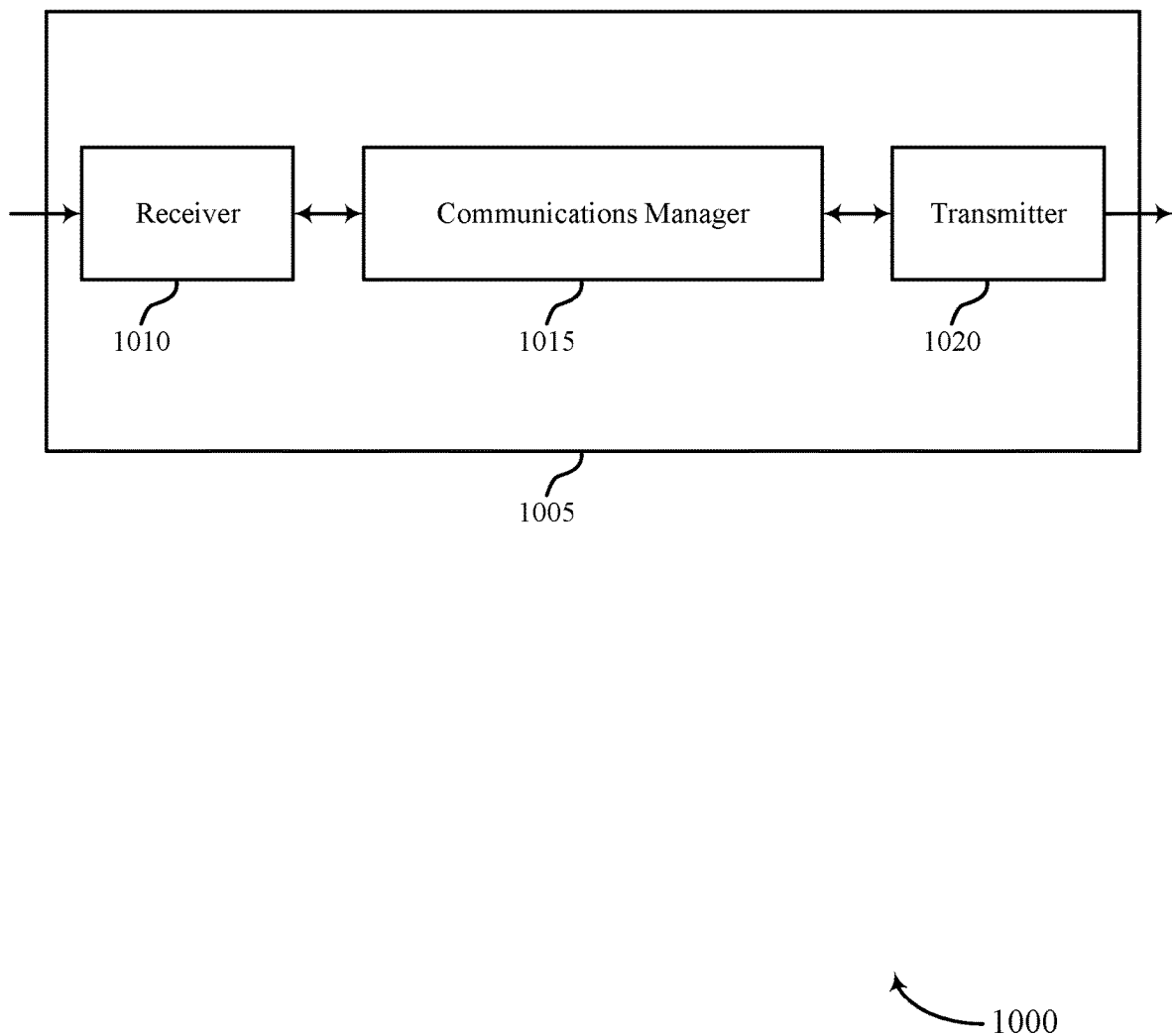
FIGS. 10 and 11 show block diagrams of devices that support sidelink beam management in accordance with aspects of the present disclosure.

FIG. 10 shows a block diagram 1000 of a device 1005 that supports sidelink beam management in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink beam management). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may establish a communication link with a first UE configured for sidelink communications with a second UE, determine one or more transmission beams for the first UE to be used for sidelink communications with the second UE, and transmit, to the first UE, transmission beam information for a sidelink message to be transmitted from the first UE to the second UE, the transmission beam information including an indication of the one or more transmission beams for transmission of the sidelink message. The communications manager 1015 may also establish a communication link with a first UE configured for sidelink communications with a second UE, determine beam training information for a sidelink beam training procedure between the first UE and the second UE, and transmit, to the first UE, an indication of the beam training information. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
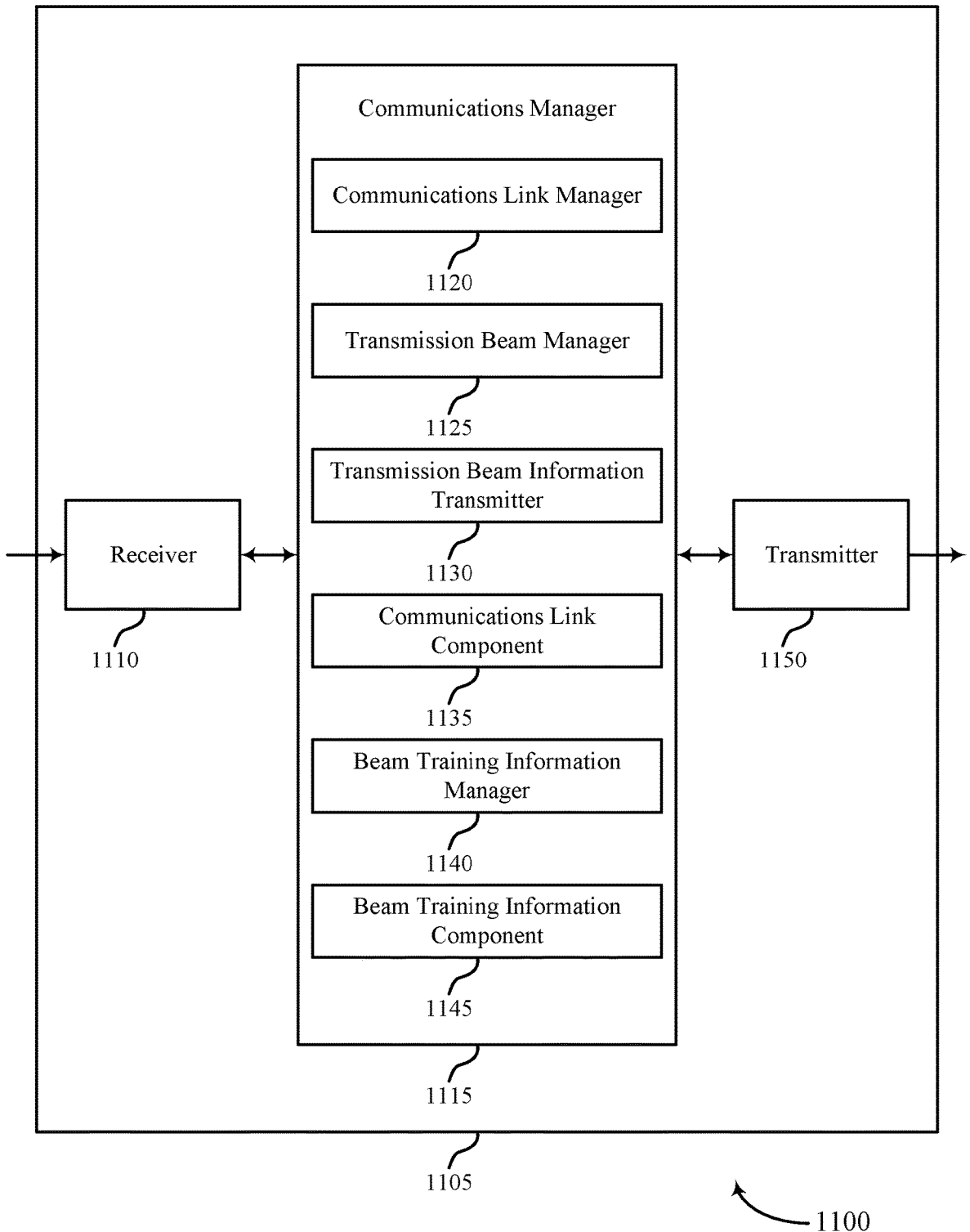

FIG. 11 shows a block diagram 1100 of a device 1105 that supports sidelink beam management in accordance with aspects of the present disclosure. The device 1105 may be an example of aspects of a device 1005, or a base station 105 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to sidelink beam management). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a communications link manager 1120, a transmission beam manager 1125, a transmission beam information transmitter 1130, a communications link component 1135, a beam training information manager 1140, and a beam training information component 1145. The communications manager 1115 may be an example of aspects of the communications manager 1310 described herein.

The communications link manager 1120 may establish a communication link with a first UE configured for sidelink communications with a second UE. The transmission beam manager 1125 may determine one or more transmission beams for the first UE to be used for sidelink communications with the second UE. The transmission beam information transmitter 1130 may transmit, to the first UE, transmission beam information for a sidelink message to be transmitted from the first UE to the second UE, the transmission beam information including an indication of the one or more transmission beams for transmission of the sidelink message.

The communications link component 1135 may establish a communication link with a first UE configured for sidelink communications with a second UE. The beam training information manager 1140 may determine beam training information for a sidelink beam training procedure between the first UE and the second UE. The beam training information component 1145 may transmit, to the first UE, an indication of the beam training information.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
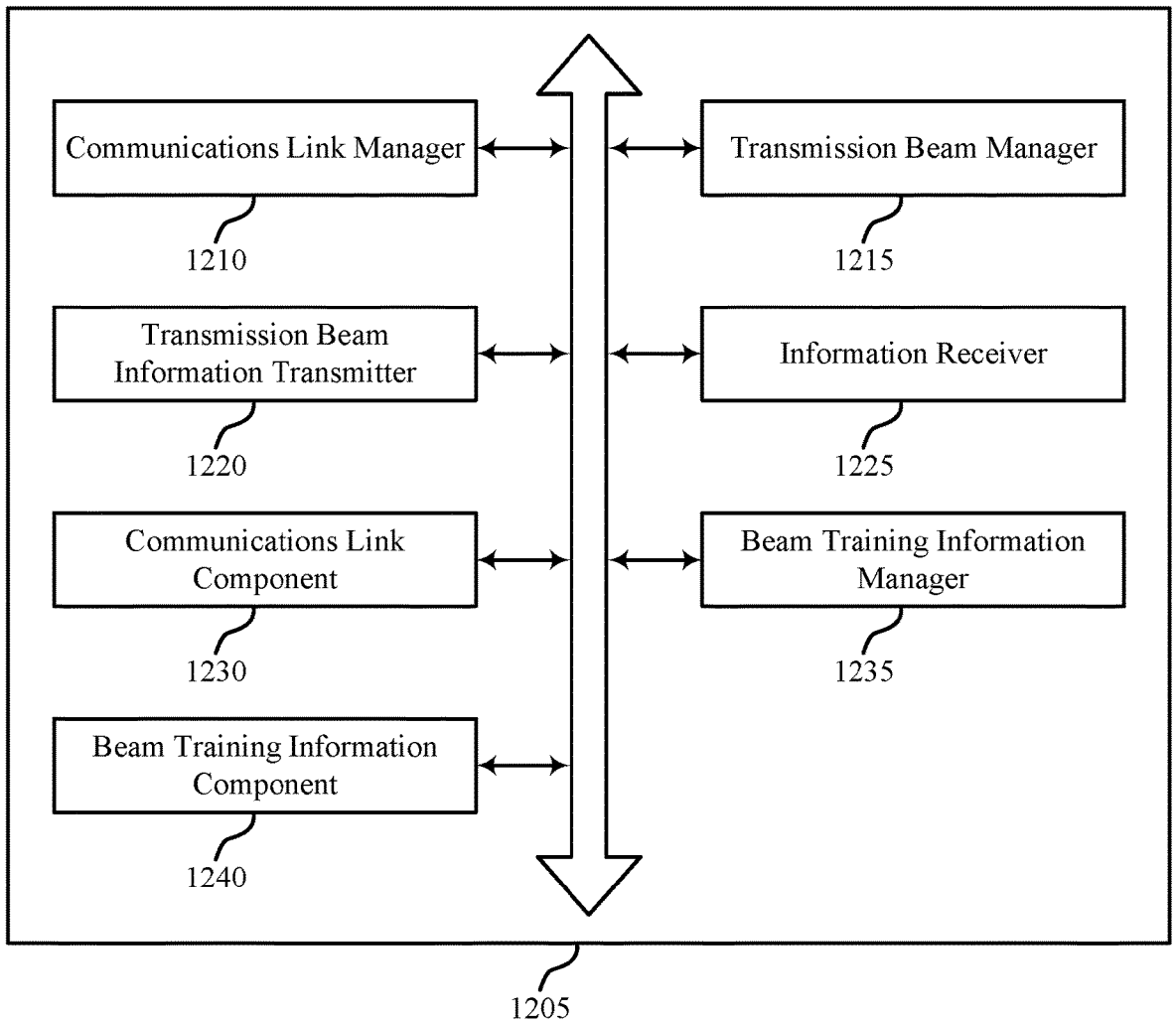
FIG. 12 shows a block diagram of a communications manager that supports sidelink beam management in accordance with aspects of the present disclosure.

FIG. 12 shows a block diagram 1200 of a communications manager 1205 that supports sidelink beam management in accordance with aspects of the present disclosure. The communications manager 1205 may be an example of aspects of a communications manager 1015, a communications manager 1115, or a communications manager 1310 described herein. The communications manager 1205 may include a communications link manager 1210, a transmission beam manager 1215, a transmission beam information transmitter 1220, an information receiver 1225, a communications link component 1230, a beam training information manager 1235, and a beam training information component 1240. Each of these modules may communicate, directly or indirectly, with one another (e.g., via one or more buses).

The communications link manager 1210 may establish a communication link with a first UE configured for sidelink communications with a second UE. The transmission beam manager 1215 may determine one or more transmission beams for the first UE to be used for sidelink communications with the second UE. In some examples, the transmission beam manager 1215 may determine the one or more transmission beams based on the set of beam parameters. In some examples, the transmission beam manager 1215 may determine the one or more transmission beams based on the set of beam pairs.

In some examples, the transmission beam manager 1215 may determine the one or more transmission beams based on the measurement information. In some examples, the transmission beam manager 1215 may transmit, to the first UE, beam training information for a sidelink beam training procedure between the first UE and the second UE, the beam training information indicating a set of transmission beams at the first UE. In some examples, the transmission beam manager 1215 may determine the one or more transmission beams based on the report. In some examples, the transmission beam manager 1215 may transmit, to the second UE or the first UE, beam training information for a sidelink beam training procedure between the first UE and the second UE based on the antenna panel information, where the beam training information indicates that the sidelink beam training procedure is for different antenna panels of the second UE being used within a partially overlapping time period.

In some examples, the transmission beam manager 1215 may transmit additional beam training information to the first UE, where the additional beam training information indicates to use different antenna panels at the second UE within a partially overlapping time period. In some cases, the transmission beam information includes beam identifiers and a time-frequency resource configuration for each of the one or more transmission beams.

The transmission beam information transmitter 1220 may transmit, to the first UE, transmission beam information for a sidelink message to be transmitted from the first UE to the second UE, the transmission beam information including an indication of the one or more transmission beams for transmission of the sidelink message. In some examples, the transmission beam information transmitter 1220 may transmit the transmission beam information via DCI, RRC signaling, or a MAC-CE.

The communications link component 1230 may establish a communication link with a first UE configured for sidelink communications with a second UE. The beam training information manager 1235 may determine beam training information for a sidelink beam training procedure between the first UE and the second UE. The beam training information component 1240 may transmit, to the first UE, an indication of the beam training information.

The information receiver 1225 may receive, from the first UE or the second UE, a set of beam parameters for a set of transmission beams for sidelink communications between the first UE and the second UE, the set of transmission beams including the one or more transmission beams. In some examples, the information receiver 1225 may receive, from the first UE or the second UE, a set of beam pairs for a set of transmission beams for sidelink communications between the first UE and the second UE, where each of the set of beam pairs corresponds to a spatially separated pair of transmission beams at the first UE.

In some examples, the information receiver 1225 may receive, from the first UE or the second UE, measurement information associated with sidelink communications between the first UE and the second UE. In some examples, the information receiver 1225 may receive a report of the sidelink beam training procedure from the first UE or the second UE based on the beam training information. In some examples, the information receiver 1225 may receive, from the second UE, antenna panel information including a number of antenna panels and respective panel orientations for a set of antenna panels of the second UE.

In some examples, the information receiver 1225 may receive, from the first UE, an indication of one or more wide beams of the first UE for the sidelink beam training procedure for one or more narrow beams of the first UE for the sidelink beam training procedure. In some cases, the set of beam parameters includes beam shape information for the set of transmission beams. In some cases, the set of beam parameters includes panel orientation for one or more antenna panels associated with the set of transmission beams. In some cases, the set of beam parameters includes geometric location of one or more antenna panels associated with the set of transmission beams. In some cases, the set of beam parameters includes a relative location of one or more antenna panels associated with the set of transmission beams with respect to the first UE. In some cases, the set of beam parameters includes beam identifiers for the set of transmission beams.

In some cases, the set of beam parameters includes codebook information for the set of transmission beams. In some cases, the set of beam parameters includes beam shape information specific to a beam identifier for each antenna panel of the first UE. In some cases, the set of beam pair includes respective transmission beam identifiers for each pair of transmission beams of the set of beam pairs. In some cases, the measurement information includes a rank indicator, a signal to interference plus noise ratio, a spectral efficiency, a cross-beam interference metric, or any combination thereof associated with a set of transmission beams of the first UE.

Figure 13:
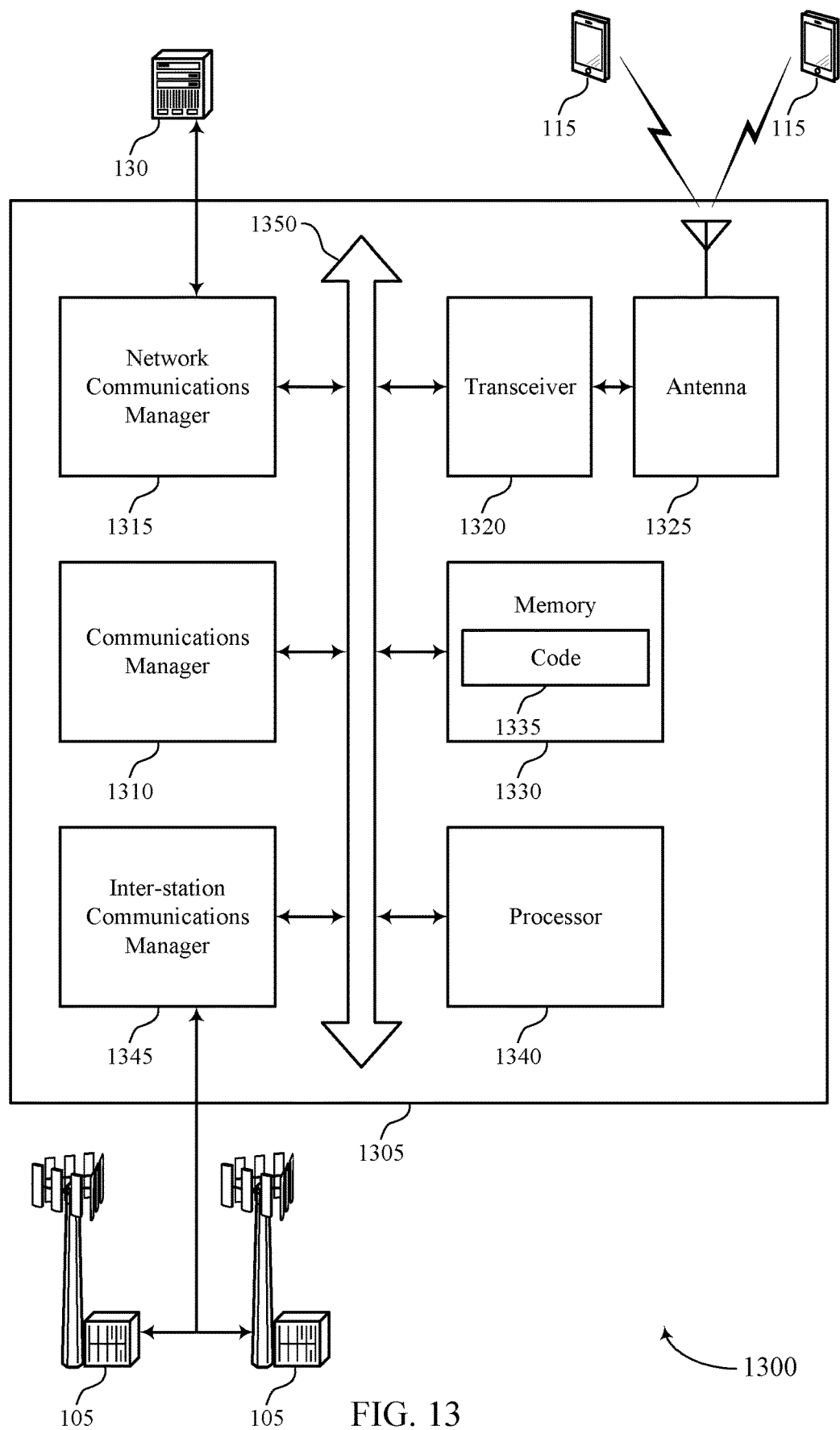
FIG. 13 shows a diagram of a system including a device that supports sidelink beam management in accordance with aspects of the present disclosure.

FIG. 13 shows a diagram of a system 1300 including a device 1305 that supports sidelink beam management in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may establish a communication link with a first UE configured for sidelink communications with a second UE, determine one or more transmission beams for the first UE to be used for sidelink communications with the second UE, and transmit, to the first UE, transmission beam information for a sidelink message to be transmitted from the first UE to the second UE, the transmission beam information including an indication of the one or more transmission beams for transmission of the sidelink message. The communications manager 1310 may also establish a communication link with a first UE configured for sidelink communications with a second UE, determine beam training information for a sidelink beam training procedure between the first UE and the second UE, and transmit, to the first UE, an indication of the beam training information.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting sidelink beam management).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
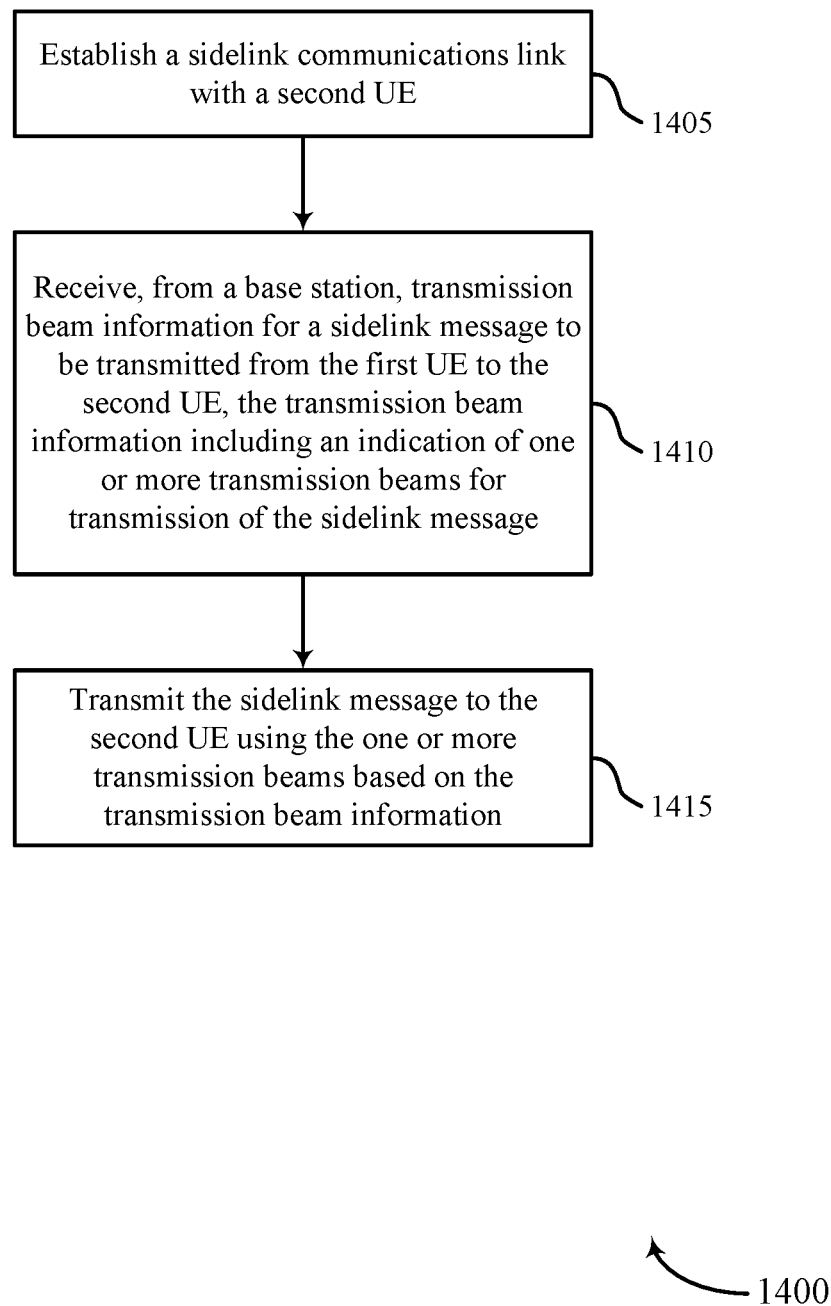
FIGS. 14 through 19 show flowcharts illustrating methods that support sidelink beam management in accordance with aspects of the present disclosure.

FIG. 14 shows a flowchart illustrating a method 1400 that supports sidelink beam management in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may establish a sidelink communications link with a second UE. The operations of 1405 may be performed according to the methods described herein. In some examples, aspects of the operations of 1405 may be performed by a sidelink communications manager as described with reference to FIGS. 6 through 9.

At 1410, the UE may receive, from a base station, transmission beam information for a sidelink message to be transmitted from the first UE to the second UE, the transmission beam information including an indication of one or more transmission beams for transmission of the sidelink message. The operations of 1410 may be performed according to the methods described herein. In some examples, aspects of the operations of 1410 may be performed by a transmission beam information receiver as described with reference to FIGS. 6 through 9.

At 1415, the UE may transmit the sidelink message to the second UE using the one or more transmission beams based on the transmission beam information. The operations of 1415 may be performed according to the methods described herein. In some examples, aspects of the operations of 1415 may be performed by a sidelink message transmitter as described with reference to FIGS. 6 through 9.

Figure 15:
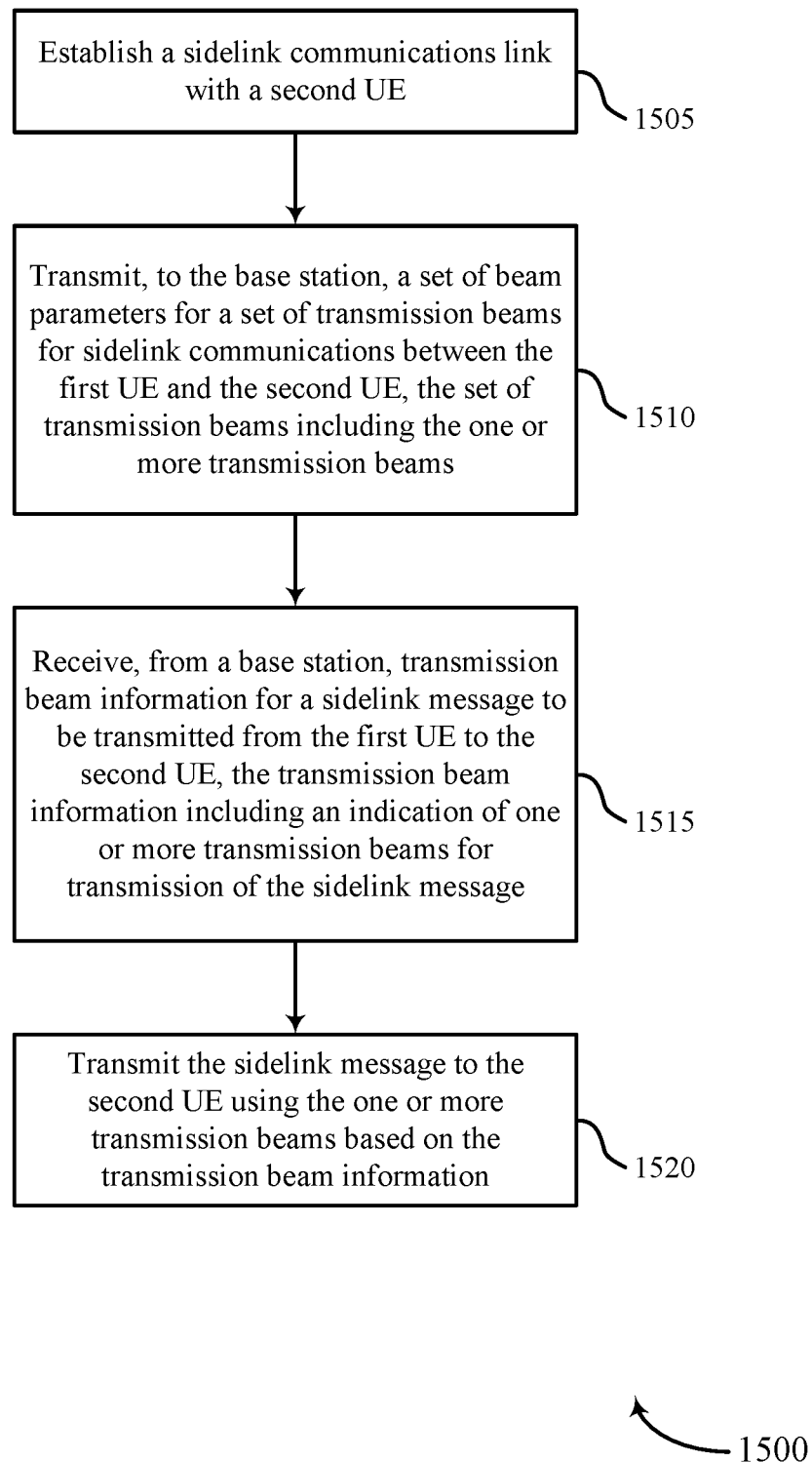

FIG. 15 shows a flowchart illustrating a method 1500 that supports sidelink beam management in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may establish a sidelink communications link with a second UE. The operations of 1505 may be performed according to the methods described herein. In some examples, aspects of the operations of 1505 may be performed by a sidelink communications manager as described with reference to FIGS. 6 through 9.

At 1510, the UE may transmit, to the base station, a set of beam parameters for a set of transmission beams for sidelink communications between the first UE and the second UE, the set of transmission beams including the one or more transmission beams. The operations of 1510 may be performed according to the methods described herein. In some examples, aspects of the operations of 1510 may be performed by an information transmitter as described with reference to FIGS. 6 through 9.

At 1515, the UE may receive, from a base station, transmission beam information for a sidelink message to be transmitted from the first UE to the second UE, the transmission beam information including an indication of one or more transmission beams for transmission of the sidelink message. The operations of 1515 may be performed according to the methods described herein. In some examples, aspects of the operations of 1515 may be performed by a transmission beam information receiver as described with reference to FIGS. 6 through 9.

At 1520, the UE may transmit the sidelink message to the second UE using the one or more transmission beams based on the transmission beam information. The operations of 1520 may be performed according to the methods described herein. In some examples, aspects of the operations of 1520 may be performed by a sidelink message transmitter as described with reference to FIGS. 6 through 9.

Figure 16:
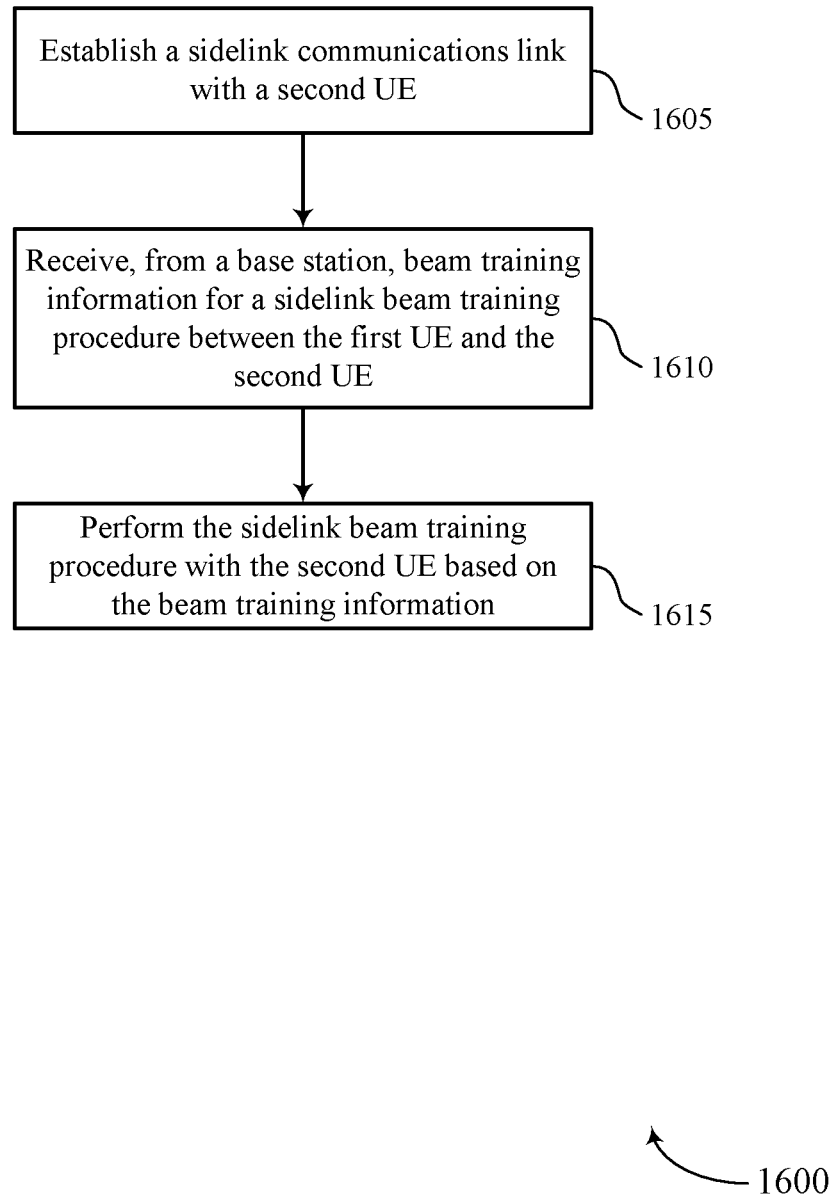

FIG. 16 shows a flowchart illustrating a method 1600 that supports sidelink beam management in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may establish a sidelink communications link with a second UE. The operations of 1605 may be performed according to the methods described herein. In some examples, aspects of the operations of 1605 may be performed by a sidelink communications module as described with reference to FIGS. 6 through 9.

At 1610, the UE may receive, from a base station, beam training information for a sidelink beam training procedure between the first UE and the second UE. The operations of 1610 may be performed according to the methods described herein. In some examples, aspects of the operations of 1610 may be performed by a beam training information receiver as described with reference to FIGS. 6 through 9.

At 1615, the UE may perform the sidelink beam training procedure with the second UE based on the beam training information. The operations of 1615 may be performed according to the methods described herein. In some examples, aspects of the operations of 1615 may be performed by a beam training module as described with reference to FIGS. 6 through 9.

Figure 17:
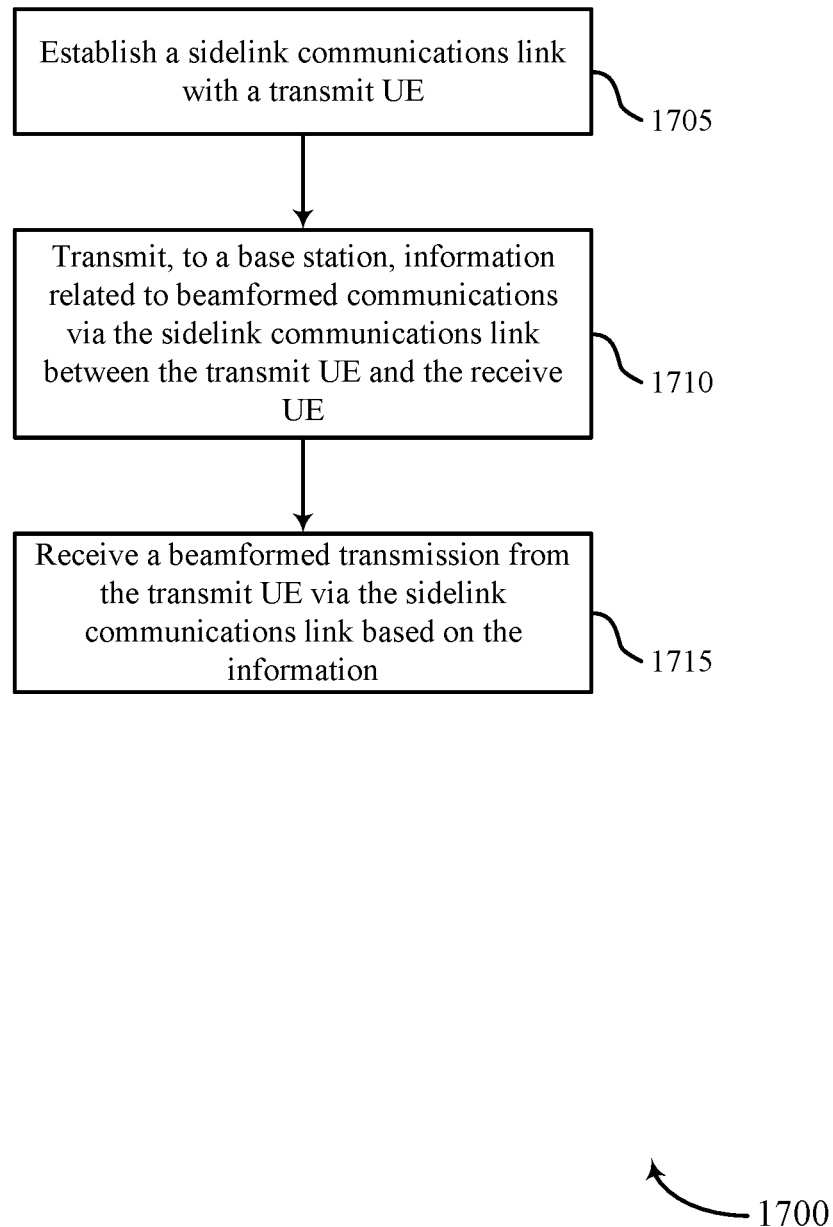

FIG. 17 shows a flowchart illustrating a method 1700 that supports sidelink beam management in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may establish a sidelink communications link with a transmit UE. The operations of 1705 may be performed according to the methods described herein. In some cases, the UE may be a receive UE and may not have a communication link established with a base station. In some examples, aspects of the operations of 1705 may be performed by a sidelink communications component as described with reference to FIGS. 6 through 9.

At 1710, the UE may transmit, to the base station, information related to beamformed communications via the sidelink communications link between the transmit UE and the receive UE. The operations of 1710 may be performed according to the methods described herein. In some examples, aspects of the operations of 1710 may be performed by a beamformed information transmitter as described with reference to FIGS. 6 through 9.

At 1715, the UE may receive a beamformed transmission from the transmit UE via the sidelink communications link based on the information. The operations of 1715 may be performed according to the methods described herein. In some examples, aspects of the operations of 1715 may be performed by a beamformed transmission receiver as described with reference to FIGS. 6 through 9.

Figure 18:
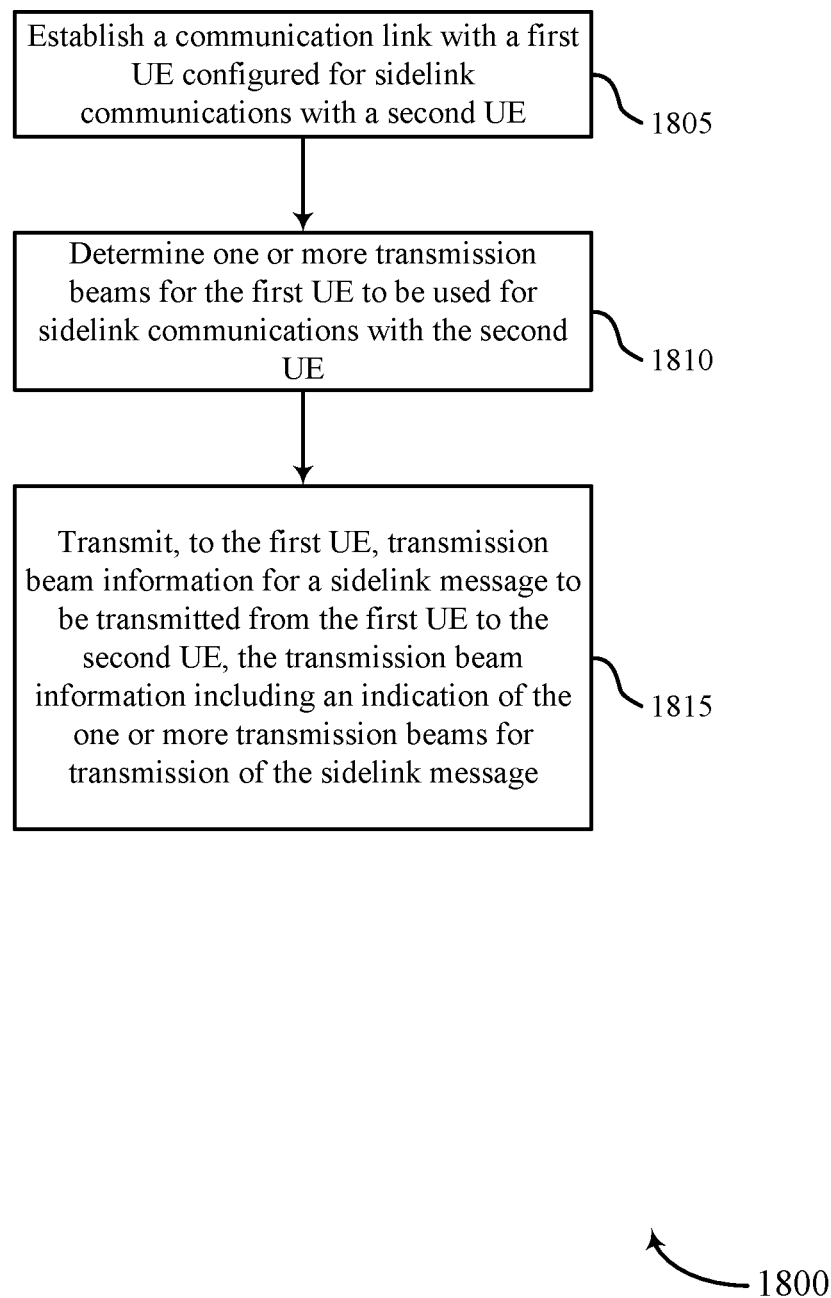

FIG. 18 shows a flowchart illustrating a method 1800 that supports sidelink beam management in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may establish a communication link with a first UE configured for sidelink communications with a second UE. The operations of 1805 may be performed according to the methods described herein. In some examples, aspects of the operations of 1805 may be performed by a communications link manager as described with reference to FIGS. 10 through 13.

At 1810, the base station may determine one or more transmission beams for the first UE to be used for sidelink communications with the second UE. The operations of 1810 may be performed according to the methods described herein. In some examples, aspects of the operations of 1810 may be performed by a transmission beam manager as described with reference to FIGS. 10 through 13.

At 1815, the base station may transmit, to the first UE, transmission beam information for a sidelink message to be transmitted from the first UE to the second UE, the transmission beam information including an indication of the one or more transmission beams for transmission of the sidelink message. The operations of 1815 may be performed according to the methods described herein. In some examples, aspects of the operations of 1815 may be performed by a transmission beam information transmitter as described with reference to FIGS. 10 through 13.

Figure 19:
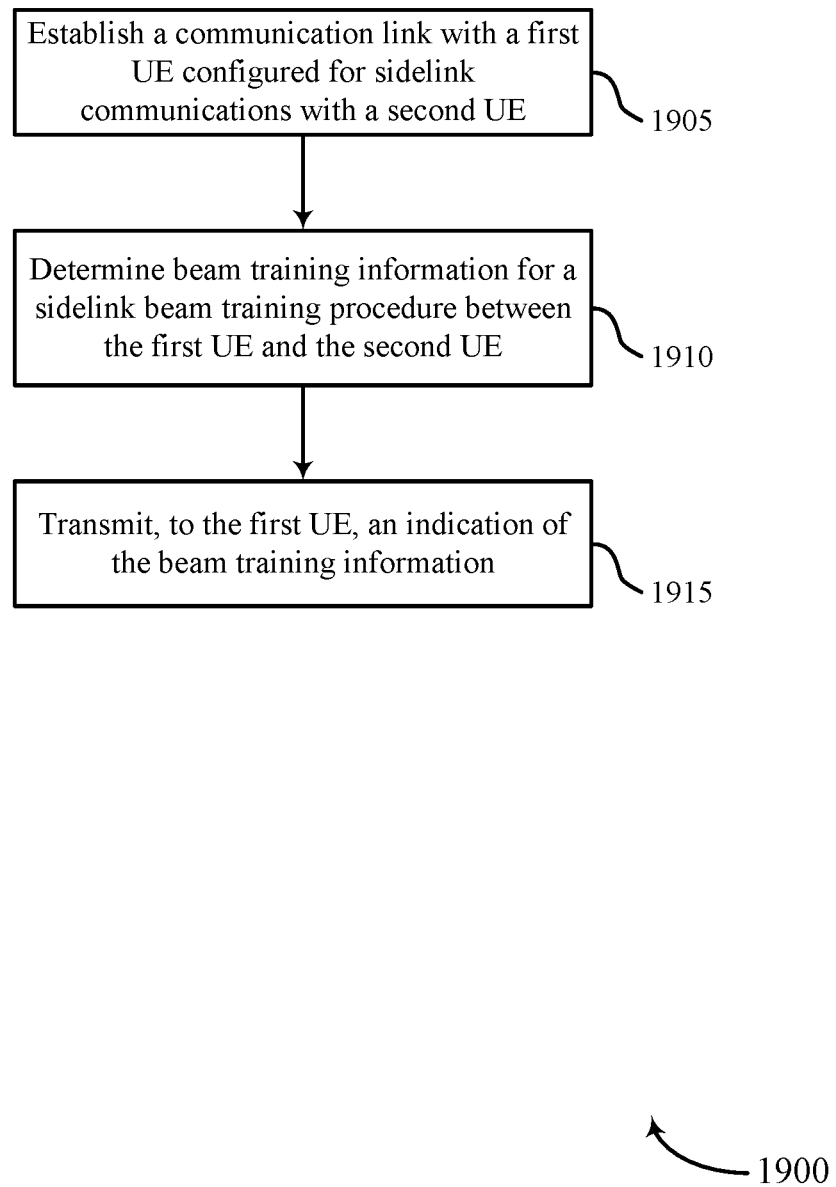

FIG. 19 shows a flowchart illustrating a method 1900 that supports sidelink beam management in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may establish a communication link with a first UE configured for sidelink communications with a second UE. The operations of 1905 may be performed according to the methods described herein. In some examples, aspects of the operations of 1905 may be performed by a communications link component as described with reference to FIGS. 10 through 13.

At 1910, the base station may determine beam training information for a sidelink beam training procedure between the first UE and the second UE. The operations of 1910 may be performed according to the methods described herein. In some examples, aspects of the operations of 1910 may be performed by a beam training information manager as described with reference to FIGS. 10 through 13.

At 1915, the base station may transmit, to the first UE, an indication of the beam training information. The operations of 1915 may be performed according to the methods described herein. In some examples, aspects of the operations of 1915 may be performed by a beam training information component as described with reference to FIGS. 10 through 13.

The following provides an overview of aspects of the present disclosure:

Aspect 1: A method for wireless communications at a first UE, comprising: establishing a sidelink communications link with a second UE; receiving, from a base station, transmission beam information for a sidelink message to be transmitted from the first UE to the second UE, the transmission beam information comprising an indication of one or more transmission beams for transmission of the sidelink message; and transmitting the sidelink message to the second UE using the one or more transmission beams based at least in part on the transmission beam information.

Aspect 2: The method of aspect 1, further comprising: transmitting, to the base station, a set of beam parameters for a set of transmission beams for sidelink communications between the first UE and the second UE, the set of transmission beams comprising the one or more transmission beams.

Aspect 3: The method of aspect 2, wherein transmitting the set of beam parameters comprises: transmitting beam shape information for the set of transmission beams.

Aspect 4: The method of any of aspects 2 through 3, wherein transmitting the set of beam parameters comprises: transmitting panel orientation for one or more antenna panels associated with the set of transmission beams.

Aspect 5: The method of any of aspects 2 through 4, wherein transmitting the set of beam parameters comprises: transmitting geometric location of one or more antenna panels associated with the set of transmission beams.

Aspect 6: The method of any of aspects 2 through 5, wherein transmitting the set of beam parameters comprises: transmitting a relative location of one or more antenna panels associated with the set of transmission beams with respect to the first UE.

Aspect 7: The method of any of aspects 2 through 6, wherein transmitting the set of beam parameters comprises: transmitting beam identifiers for the set of transmission beams.

Aspect 8: The method of any of aspects 2 through 7, wherein transmitting the set of beam parameters comprises: transmitting codebook information for the set of transmission beams.

Aspect 9: The method of any of aspects 2 through 8, wherein transmitting the set of beam parameters comprises: transmitting beam shape information specific to a beam identifier for each antenna panel of the first UE.

Aspect 10: The method of any of aspects 1 through 9, further comprising: transmitting, to the base station, a set of beam pairs for a set of transmission beams for sidelink communications between the first UE and the second UE, wherein each of the set of beam pairs corresponds to a spatially separated pair of transmission beams at the first UE.

Aspect 11: The method of aspect 10, wherein transmitting the set of beam pairs comprises: transmitting respective transmission beam identifiers for each pair of transmission beams of the set of beam pairs.

Aspect 12: The method of any of aspects 1 through 11, further comprising: transmitting, to the base station, measurement information associated with sidelink communications between the first UE and the second UE, wherein the transmission beam information is based at least in part on the measurement information.

Aspect 13: The method of aspect 12, wherein transmitting the measurement information comprises: transmitting a beam report that indicates one or more measurement parameters for a pair of transmission beams at the first UE.

Aspect 14: The method of aspect 13, wherein the one or more measurement parameters comprise a rank indicator, a signal to interference plus noise ratio, a spectral efficiency, a cross-beam interference metric, or any combination thereof.

Aspect 15: The method of any of aspects 1 through 14, wherein receiving the transmission beam information comprises: receiving the transmission beam information via DCI, RRC signaling, or a MAC-CE.

Aspect 16: The method of any of aspects 1 through 15, wherein the transmission beam information comprises beam identifiers and a time-frequency resource configuration for each of the one or more transmission beams.

Aspect 17: The method of any of aspects 1 through 16, wherein the first and second UEs are configured for multiple-input multiple-output (MIMO) communications via the sidelink communications link.

Aspect 18: The method of any of aspects 1 through 16, wherein the base station comprises a cellular base station or a controlling UE.

Aspect 19: A method for wireless communications at a first UE, comprising: establishing a sidelink communications link with a second UE; receiving, from a base station, beam training information for a sidelink beam training procedure between the first UE and the second UE; and performing the sidelink beam training procedure with the second UE based at least in part on the beam training information.

Aspect 20: The method of aspect 19, further comprising: receiving, from the second UE, antenna panel information including a number of antenna panels and respective panel orientations for a set of antenna panels of the second UE; and transmitting, to the second UE, additional beam training information for a sidelink beam training procedure between the first UE and the second UE based at least in part on the antenna panel information, wherein the additional beam training information indicates that the sidelink beam training procedure is for different antenna panels of the second UE being used within a partially overlapping time period.

Aspect 21: The method of aspect 20, further comprising: transmitting, to the base station, an indication of one or more wide beams of the first UE for the sidelink beam training procedure for one or more narrow beams of the first UE for the sidelink beam training procedure; receiving additional beam training information from the base station, wherein the additional beam training information indicates to use different antenna panels at the second UE within a partially overlapping time period; and transmitting the additional beam training information to the second UE.

Aspect 22: The method of any of aspects 19 through 21, wherein the beam training information indicates a set of transmission beams at the first UE; and the sidelink beam training procedure is performed simultaneously for multiple transmission beams in the set of transmission beams.

Aspect 23: The method of any of aspects 19 through 22, wherein the sidelink beam training procedure is an orthogonalized beam training procedure according to one of code division multiplexing (CDM), sequence-based training, or frequency division multiplexing (FDM).

Aspect 24: The method of aspect 23, wherein the sidelink beam training procedure uses different panels of the first UE.

Aspect 25: The method of any of aspects 19 through 24, wherein performing the sidelink beam training procedure comprises: concurrently transmitting reference signals via multiple transmission beams at the first UE.

Aspect 26: A method for wireless communications at a receive UE, comprising: establishing a sidelink communications link with a transmit UE; transmitting, to a base station, information related to beamformed communications via the sidelink communications link between the transmit UE and the receive UE; and receiving a beamformed transmission from the transmit UE via the sidelink communications link based at least in part on the information.

Aspect 27: The method of aspect 26, wherein transmitting the information related to beamformed communications via the sidelink communications link comprises:

transmitting, to the base station, a set of beam parameters for a set of reception beams for sidelink communications between the first UE and the second UE, wherein the set of beam parameters comprises beam shape information for the set of reception beams, panel orientation for one or more antenna panels associated with the set of reception beams, geometric location of one or more antenna panels associated with the set of reception beams, a relative location of one or more antenna panels associated with the set of reception beams with respect to the first UE, beam identifiers for the set of reception beams, codebook information for the set of reception beams, beam shape information specific to a beam identifier for each antenna panel of the receive UE.

Aspect 28: The method of any of aspects 26 through 27, wherein transmitting the information related to beamformed communications via the sidelink communications link comprises: transmitting, to the base station, a set of beam pairs for a set of reception beams for sidelink communications between the first UE and the second UE, wherein each of the set of beam pairs corresponds to a spatially separated pair of reception beams at the receive UE.

Aspect 29: The method of any of aspects 26 through 28, wherein transmitting the information related to beamformed communications via the sidelink communications link comprises: transmitting, to the base station or the transmit UE, a beam report that indicates one or more measurement parameters for a pair of reception beams at the receive UE, wherein the one or more measurement parameters comprise a rank indicator, a signal to interference plus noise ratio, a spectral efficiency, a cross-beam interference metric, or any combination thereof.

Aspect 30: A method for wireless communications at a base station, comprising: establishing a communication link with a first UE configured for sidelink communications with a second UE; determining one or more transmission beams for the first UE to be used for sidelink communications with the second UE; and transmitting, to the first UE, transmission beam information for a sidelink message to be transmitted from the first UE to the second UE, the transmission beam information comprising an indication of the one or more transmission beams for transmission of the sidelink message.

Aspect 31: The method of aspect 30, further comprising: receiving, from the first UE or the second UE, a set of beam parameters for a set of transmission beams for sidelink communications between the first UE and the second UE, the set of transmission beams comprising the one or more transmission beams; and determining the one or more transmission beams based at least in part on the set of beam parameters.

Aspect 32: The method of aspect 31, wherein the set of beam parameters comprises beam shape information for the set of transmission beams.

Aspect 33: The method of any of aspects 31 through 32, wherein the set of beam parameters comprises panel orientation for one or more antenna panels associated with the set of transmission beams.

Aspect 34: The method of any of aspects 31 through 33, wherein the set of beam parameters comprises geometric location of one or more antenna panels associated with the set of transmission beams.

Aspect 35: The method of any of aspects 31 through 34, wherein the set of beam parameters comprises a relative location of one or more antenna panels associated with the set of transmission beams with respect to the first UE.

Aspect 36: The method of any of aspects 31 through 35, wherein the set of beam parameters comprises beam identifiers for the set of transmission beams.

Aspect 37: The method of any of aspects 31 through 36, wherein the set of beam parameters comprises codebook information for the set of transmission beams.

Aspect 38: The method of any of aspects 31 through 37, wherein the set of beam parameters comprises beam shape information specific to a beam identifier for each antenna panel of the first UE.

Aspect 39: The method of any of aspects 30 through 38, further comprising: receiving, from the first UE or the second UE, a set of beam pairs for a set of transmission beams for sidelink communications between the first UE and the second UE, wherein each of the set of beam pairs corresponds to a spatially separated pair of transmission beams at the first UE; and determining the one or more transmission beams based at least in part on the set of beam pairs.

Aspect 40: The method of aspect 39, wherein the set of beam pair comprises respective transmission beam identifiers for each pair of transmission beams of the set of beam pairs.

Aspect 41: The method of any of aspects 30 through 40, further comprising: receiving, from the first UE or the second UE, measurement information associated with sidelink communications between the first UE and the second UE; and determining the one or more transmission beams based at least in part on the measurement information.

Aspect 42: The method of aspect 41, wherein the measurement information comprises a rank indicator, a signal to interference plus noise ratio, a spectral efficiency, a cross-beam interference metric, or any combination thereof associated with a set of transmission beams of the first UE.

Aspect 43: The method of any of aspects 30 through 42, further comprising: transmitting the transmission beam information via DCI, RRC signaling, or a MAC-CE.

Aspect 44: The method of any of aspects 30 through 43, wherein the transmission beam information comprises beam identifiers and a time-frequency resource configuration for each of the one or more transmission beams.

Aspect 45: The method of any of aspects 30 through 44, further comprising: transmitting, to the first UE, beam training information for a sidelink beam training procedure between the first UE and the second UE, the beam training information indicating a set of transmission beams at the first UE.

Aspect 46: The method of aspect 45, further comprising: receiving a report of the sidelink beam training procedure from the first UE or the second UE based at least in part on the beam training information; and determining the one or more transmission beams based at least in part on the report.

Aspect 47: The method of any of aspects 30 through 46, further comprising: receiving, from the second UE, antenna panel information including a number of antenna panels and respective panel orientations for a set of antenna panels of the second UE; and transmitting, to the second UE or the first UE, beam training information for a sidelink beam training procedure between the first UE and the second UE based at least in part on the antenna panel information, wherein the beam training information indicates that the sidelink beam training procedure is for different antenna panels of the second UE being used within a partially overlapping time period.

Aspect 48: The method of any of aspects 30 through 47, further comprising: receiving, from the first UE, an indication of one or more wide beams of the first UE for the beam training procedure for one or more narrow beams of the first UE for the sidelink beam training procedure; and transmitting additional beam training information to the first UE, wherein the additional beam training information indicates to use different antenna panels at the second UE within a partially overlapping time period.

Aspect 49: A method for wireless communications at a base station, comprising: establishing a communication link with a first UE configured for sidelink communications with a second UE; determining beam training information for a sidelink beam training procedure between the first UE and the second UE; and transmitting, to the first UE, an indication of the beam training information.

Aspect 50: An apparatus for wireless communications at a first UE, comprising a processor; memory coupled with the processor; and instructions stored in the memory and executable by the processor to cause the apparatus to perform a method of any of aspects 1 through 17.

Aspect 51: An apparatus for wireless communications at a first UE, comprising at least one means for performing a method of any of aspects 1 through 17.

Aspect 52: A non-transitory computer-readable medium storing code for wireless communications at a first UE, the code comprising instructions executable by a processor to perform a method of any of aspects 1 through 17.

Aspect 53: An apparatus comprising a processor; memory coupled with the processor; and instructions stored in the memory and executable by the processor to cause the apparatus to perform a method of any of aspects 19 through 25.

Aspect 54: An apparatus comprising at least one means for performing a method of any of aspects 19 through 25.

Aspect 55: A non-transitory computer-readable medium storing code the code comprising instructions executable by a processor to perform a method of any of aspects 19 through 25.

Aspect 56: An apparatus comprising a processor; memory coupled with the processor; and instructions stored in the memory and executable by the processor to cause the apparatus to perform a method of any of aspects 26 through 29.

Aspect 57: An apparatus comprising at least one means for performing a method of any of aspects 26 through 29.

Aspect 58: A non-transitory computer-readable medium storing code the code comprising instructions executable by a processor to perform a method of any of aspects 26 through 29.

Aspect 59: An apparatus comprising a processor; memory coupled with the processor; and instructions stored in the memory and executable by the processor to cause the apparatus to perform a method of any of aspects 30 through 48.

Aspect 60: An apparatus comprising at least one means for performing a method of any of aspects 30 through 48.

Aspect 61: A non-transitory computer-readable medium storing code the code comprising instructions executable by a processor to perform a method of any of aspects 30 through 48.

Aspect 62: An apparatus comprising a processor; memory coupled with the processor; and instructions stored in the memory and executable by the processor to cause the apparatus to perform a method of aspect 49.

Aspect 63: An apparatus comprising at least one means for performing a method of aspect 49.

Aspect 64: A non-transitory computer-readable medium storing code the code comprising instructions executable by a processor to perform a method of aspect 49.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first user equipment (UE), comprising:
    a processor;
    memory coupled with the processor; and
    instructions stored in the memory and executable by the processor to cause the apparatus to:
        establish a sidelink communications link with a second UE;
        receive, from a network device, transmission beam information for a sidelink message to be transmitted from the first UE to the second UE, the transmission beam information comprising an indication of one or more beam identifiers, wherein each beam identifier of the one or more beam identifiers corresponds to a respective transmission beam for transmission of the sidelink message; and
        transmit the sidelink message to the second UE using the respective transmission beams based at least in part on the one or more beam identifiers indicated in the transmission beam information.

2. The apparatus of claim 1, wherein the instructions are further executable by the processor to cause the apparatus to:
    transmit, to the network device, a set of beam parameters for a set of transmission beams for sidelink communications between the first UE and the second UE, the set of transmission beams comprising the respective transmission beams.

3. The apparatus of claim 2, wherein the instructions to transmit the set of beam parameters are executable by the processor to cause the apparatus to:
    transmit beam shape information for the set of transmission beams.

4. The apparatus of claim 2, wherein the instructions to transmit the set of beam parameters are executable by the processor to cause the apparatus to:
    transmit panel orientation for one or more antenna panels associated with the set of transmission beams.

5. The apparatus of claim 2, wherein the instructions to transmit the set of beam parameters are executable by the processor to cause the apparatus to:
    transmit geometric location of one or more antenna panels associated with the set of transmission beams.

6. The apparatus of claim 2, wherein the instructions to transmit the set of beam parameters are executable by the processor to cause the apparatus to:
    transmit a relative location of one or more antenna panels associated with the set of transmission beams with respect to the first UE.

7. The apparatus of claim 2, wherein the instructions to transmit the set of beam parameters are executable by the processor to cause the apparatus to:
    transmit beam identifiers for the set of transmission beams.

8. The apparatus of claim 2, wherein the instructions to transmit the set of beam parameters are executable by the processor to cause the apparatus to:
    transmit codebook information for the set of transmission beams.

9. The apparatus of claim 2, wherein the instructions to transmit the set of beam parameters are executable by the processor to cause the apparatus to:
    transmit beam shape information specific to a beam identifier for each antenna panel of the first UE.

10. The apparatus of claim 1, wherein the instructions are further executable by the processor to cause the apparatus to:
    transmit, to the network device, a set of beam pairs for a set of transmission beams for sidelink communications between the first UE and the second UE, wherein each of the set of beam pairs corresponds to a spatially separated pair of transmission beams at the first UE.

11. The apparatus of claim 10, wherein the instructions to transmit the set of beam pairs are executable by the processor to cause the apparatus to:
    transmit respective transmission beam identifiers for each pair of transmission beams of the set of beam pairs.

12. The apparatus of claim 1, wherein the instructions are further executable by the processor to cause the apparatus to:
    transmit, to the network device, measurement information associated with sidelink communications between the first UE and the second UE, wherein the transmission beam information is based at least in part on the measurement information.

13. The apparatus of claim 12, wherein the instructions to transmit the measurement information are executable by the processor to cause the apparatus to:
transmit a beam report that indicates one or more measurement parameters for a pair of transmission beams at the first UE.

14. The apparatus of claim 13, wherein the one or more measurement parameters comprise a rank indicator, a signal to interference plus noise ratio, a spectral efficiency, a cross-beam interference metric, or any combination thereof.

15. The apparatus of claim 1, wherein the instructions to receive the transmission beam information are executable by the processor to cause the apparatus to:
receive the transmission beam information via downlink control information (DCI), radio resource control (RRC) signaling, or a medium access control (MAC) control element (MAC-CE).

16. The apparatus of claim 1, wherein the transmission beam information a time-frequency resource configuration for each of the respective transmission beams.

17. The apparatus of claim 1, wherein the first UE and the second UE are configured for multiple-input multiple-output (MIMO) communications via the sidelink communications link.

18. The apparatus of claim 1, wherein the network device comprises a cellular base station or a controlling UE.

19. The apparatus of claim 1, wherein the instructions to receive the transmission beam information are executable by the processor to cause the apparatus to:
receive a sidelink resource grant, the sidelink resource grant comprising the transmission beam information, time resources, and frequency resources, the time resources and the frequency resources for transmission of the sidelink message.

20. A method for wireless communications at a first user equipment (UE), comprising:
establishing a sidelink communications link with a second UE;
receiving, from a network device, transmission beam information for a sidelink message to be transmitted from the first UE to the second UE, the transmission beam information comprising an indication of one or more beam identifiers, wherein each beam identifier of the one or more beam identifiers corresponds to a respective transmission beam for transmission of the sidelink message; and
transmitting the sidelink message to the second UE using the respective transmission beams based at least in part on the one or more beam identifiers indicated in the transmission beam information.

21. The method of claim 20, further comprising:
transmitting, to the network device, a set of beam parameters for a set of transmission beams for sidelink communications between the first UE and the second UE, the set of transmission beams comprising the respective transmission beams.

22. The method of claim 21, wherein transmitting the set of beam parameters comprises:
transmitting beam shape information for the set of transmission beams.

23. The method of claim 21, wherein transmitting the set of beam parameters comprises:
transmitting panel orientation for one or more antenna panels associated with the set of transmission beams.

24. The method of claim 20, further comprising:
transmitting, to the network device, a set of beam pairs for a set of transmission beams for sidelink communications between the first UE and the second UE, wherein each of the set of beam pairs corresponds to a spatially separated pair of transmission beams at the first UE.

25. The method of claim 20, further comprising:
transmitting, to the network device, measurement information associated with sidelink communications between the first UE and the second UE, wherein the transmission beam information is based at least in part on the measurement information.

26. The method of claim 20, wherein receiving the transmission beam information comprises:
receiving the transmission beam information via downlink control information (DCI), radio resource control (RRC) signaling, or a medium access control (MAC) control element (MAC-CE).

27. The method of claim 20, wherein the transmission beam information a time-frequency resource configuration for each of the respective transmission beams.

28. The method of claim 20, wherein the first UE and the second UE are configured for multiple-input multiple-output (MIMO) communications via the sidelink communications link.

29. The method of claim 20, wherein the network device comprises a cellular base station or a controlling UE.

30. The method of claim 20, wherein receiving the transmission beam information comprises:
receiving a sidelink resource grant, the sidelink resource grant comprising the transmission beam information, time resources, and frequency resources, the time resources and the frequency resources for transmission of the sidelink message.

* * * * *